United States Patent
Bang et al.

(10) Patent No.: US 9,664,956 B2
(45) Date of Patent: May 30, 2017

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Jung Suk Bang, Seoul (KR); Seon Uk Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/328,213

(22) Filed: Jul. 10, 2014

(65) Prior Publication Data

US 2015/0205152 A1 Jul. 23, 2015

(30) Foreign Application Priority Data

Jan. 20, 2014 (KR) .................. 10-2014-0006905

(51) Int. Cl.
| | |
|---|---|
| H01L 27/12 | (2006.01) |
| G02F 1/1335 | (2006.01) |
| G02F 1/1343 | (2006.01) |
| G02F 1/1341 | (2006.01) |
| G02F 1/1333 | (2006.01) |

(52) U.S. Cl.
CPC ...... *G02F 1/1341* (2013.01); *G02F 1/133377* (2013.01)

(58) Field of Classification Search
CPC ............. G02F 1/136209; G02F 1/1341; H01L 27/1248; H01L 27/1262
USPC ..................................... 257/43, 79
See application file for complete search history.

(56) References Cited

U.S. PATENT DOCUMENTS

| | | | |
|---|---|---|---|
| 2004/0109098 A1* | 6/2004 | Kim .................. | G02F 1/133514 349/38 |
| 2008/0088788 A1* | 4/2008 | Cho .................. | G02F 1/133514 349/160 |
| 2013/0093985 A1* | 4/2013 | Kang ................ | G02F 1/133377 349/106 |

FOREIGN PATENT DOCUMENTS

KR   10-2005-0113933   12/2005

* cited by examiner

*Primary Examiner* — Long K Tran
*Assistant Examiner* — Thai T Vuong
(74) *Attorney, Agent, or Firm* — Innovation Counsel LLP

(57) ABSTRACT

The inventive concept relates to a liquid crystal display and a manufacturing method thereof. More particularly, the inventive concept relates to a liquid crystal display including one substrate and a manufacturing method thereof. A liquid crystal display according to an exemplary embodiment of the inventive concept includes: a thin film transistor; a passivation layer; a pixel electrode; an opposing electrode disposed on the pixel electrode and spaced apart from the pixel electrode by a microcavity interposed therebetween; a roof layer disposed on the opposing electrode and overlapping the pixel electrode, wherein the roof layer and the opposing electrode form a valley exposing an injection hole of the microcavity, a buffer zone disposed between the light transmitting area and the valley and a light blocking member overlapping the valley. A height of the microcavity in the buffer zone is higher than a height of the microcavity in the light transmitting area.

12 Claims, 21 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2014-0006905 filed in the Korean Intellectual Property Office on Jan. 20, 2014, the entire contents of which are incorporated herein by reference.

BACKGROUND (a) Technical Field

The inventive concept relates to a liquid crystal display and a manufacturing method thereof. More particularly, the inventive concept relates to a liquid crystal display including one substrate and a manufacturing method thereof.

(b) Description of the Related Art

A liquid crystal display is currently one of the most widely used flat panel displays, and includes two display substrates on which field generating electrodes such as a pixel electrode and an opposing electrode are formed and a liquid crystal layer that is disposed therebetween, and displays an image by applying a voltage to a field generating electrode to generate an electric field on the liquid crystal layer, which determines alignment of liquid crystal molecules of the liquid crystal layer and controls polarization of incident light.

Two display substrates forming the liquid crystal display may consist of a thin film transistor array substrate and an opposing substrate. In the thin film transistor array substrate, a gate line transmitting a gate signal and a data line transmitting a data signal are formed to be crossed, a thin film transistor connected to the gate line and the data line, and a pixel electrode connected to the thin film transistor may be formed. The opposing substrate may include a light blocking member, a color filter, an opposing electrode, etc. If necessary, the light blocking member, the color filter, and the opposing electrode may be formed on the thin film transistor array substrate.

However, in the conventional liquid crystal display, two substrates are inevitably required, and the constituent elements are respectively formed on the two substrates such that the display device is heavy, the cost is high, and the processing time is long.

The above information disclosed in this background section is only for enhancement of understanding of the background of the inventive concept and therefore it may contain information that does not form the prior art.

SUMMARY

A process of manufacturing the liquid crystal display including one substrate includes injecting a liquid crystal material to form the liquid crystal layer, if the liquid crystal material remains in an area other than the defined liquid crystal layer, a display defect that appears like a pinhole caused by the remaining liquid crystal material may be generated. In contrast, when the liquid crystal material is not completely filled in the liquid crystal layer of the display area, a dark portion or a texture is generated in the display area, thereby generating a display defect.

Accordingly, the inventive concept prevents the display defect by preventing the liquid crystal material from remaining in the area other than the predetermined liquid crystal layer or by preventing a removal of the liquid crystal material in the liquid crystal layer of the display area in the process of manufacturing of the liquid crystal display including one substrate.

A liquid crystal display according to an exemplary embodiment of the inventive concept includes: a thin film transistor disposed on a substrate; a passivation layer disposed on the thin film transistor; a pixel electrode disposed on the passivation layer and at a light transmitting area; an opposing electrode disposed on the pixel electrode and spaced apart from the pixel electrode by a microcavity interposed therebetween; and a roof layer disposed on the opposing electrode and overlapping the pixel electrode, wherein the roof layer and the opposing electrode form a valley exposing an injection hole of the microcavity, a buffer zone disposed between the light transmitting area and the valley and a light blocking member overlapping the valley. A height of the microcavity in the buffer zone is higher than a height of the microcavity in the light transmitting area.

A first insulating layer disposed between the passivation layer and the pixel electrode may be further included, and the first insulating layer may include a first opening where the first insulating layer is removed in the buffer zone and the valley.

An edge of the first opening may be disposed on a color filter on the light transmitting area.

The pixel electrode may include a pad formed in the valley and the light blocking member directly contacts the pad.

The light blocking member may not overlap the first insulating layer.

An upper surface of the light blocking member disposed at the buffer zone and the valley may be lower than an upper surface of the pixel electrode at the light transmitting area.

A manufacturing method of a liquid crystal display according to an exemplary embodiment of the inventive concept includes: forming a thin film transistor on a substrate; forming a passivation layer on the thin film transistor; forming a pixel electrode at a light transmitting area on the passivation layer; forming a sacrificial layer on the pixel electrode; forming a light blocking member overlapping the valley and a buffer zone disposed between the light transmitting area and the valley; forming an opposing electrode on the sacrificial layer; forming a roof layer overlapping the pixel electrode on the opposing electrode; patterning the opposing electrode to form a valley and expose the sacrificial layer through the valley; removing the sacrificial layer through the valley to form a microcavity between the pixel electrode and the opposing electrode; injecting a liquid crystal material into the microcavity through an injection hole of the microcavity; and removing the liquid crystal material disposed at an area other than the light transmitting area, wherein a height of the microcavity in the buffer zone may be higher than a height of the microcavity in the light transmitting area.

In the removing of the liquid crystal material disposed at the area other than the light transmitting area, the liquid crystal material that existed in the microcavity of the light transmitting area may not be removed, and the liquid crystal material that existed in the microcavity of the buffer zone may not be removed or be partially removed.

The method may further include forming a first insulating layer disposed between the passivation layer and the pixel electrode, and forming a first opening by removing the first insulating layer at the buffer zone and the valley.

The method may further include forming a color filter between the first insulating layer and the passivation layer.

An edge of the first opening may be disposed on a color filter on the light transmitting area, the pixel electrode may include a pad formed in the valley and the light blocking member directly contact the pad, and the light blocking member may not overlap the first insulating layer.

The method may further include forming a first insulating layer disposed between the passivation layer and the pixel electrode, and the first insulating layer may include a portion disposed in at least one of the buffer zone and the valley.

According to an exemplary embodiment of the inventive concept, transmittance of the display device and lateral visibility may be improved, and display quality of the display device may be increased.

DETAILED DESCRIPTION OF THE EMBODIMENTS

Figure 1:
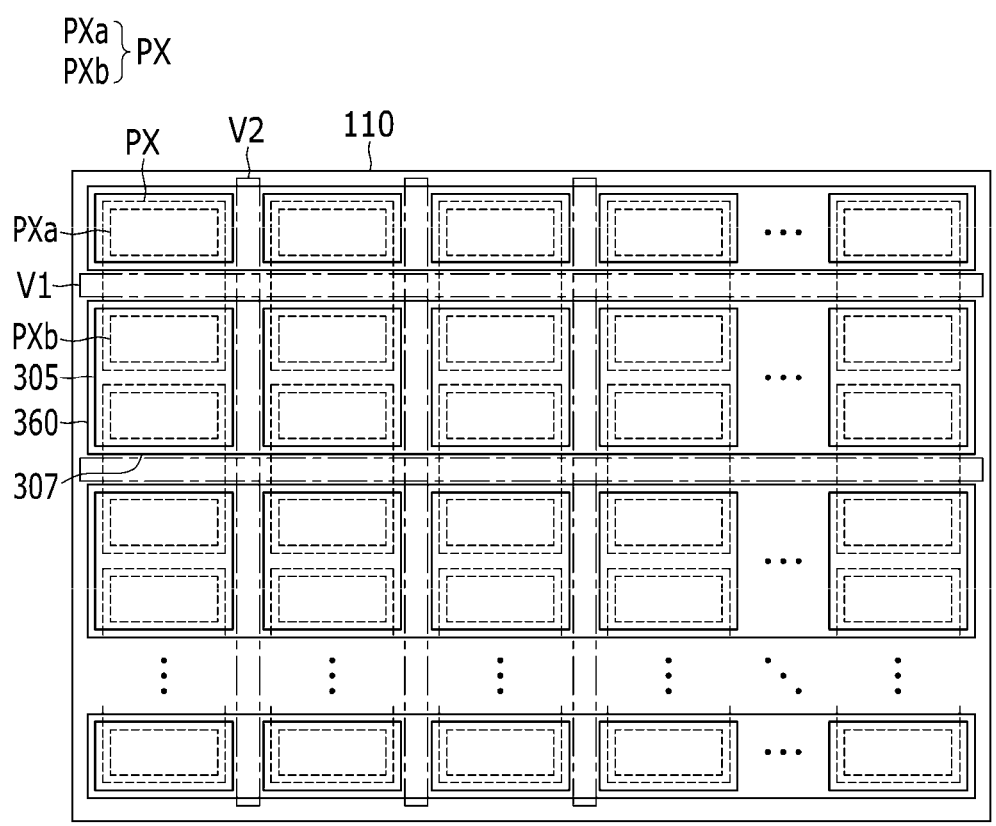
FIG. 1 is a top plan view of a liquid crystal display according to an exemplary embodiment of the inventive concept.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or formed with intervening elements. In contrast, when an element is referred to as being "directly on" another element, there are no intervening elements present.

Now, a liquid crystal display and a manufacturing method thereof according to an exemplary embodiment of the inventive concept will be described with reference to accompanying drawings.

Firstly, a liquid crystal display according to an exemplary embodiment of the inventive concept will be described with reference to FIG. 1.

FIG. 1 is a top plan view of a liquid crystal display according to an exemplary embodiment of the inventive concept.

A liquid crystal display according to an exemplary embodiment of the inventive concept includes a substrate 110 made of glass or plastic and a plurality of pixels PXs formed on the substrate 110.

The plurality of pixels PXs may be arranged in a matrix shape including a plurality of pixel rows and a plurality of pixel columns.

Each of the plurality of pixels PXs may display one of primary colors. For example, each pixel PX may uniquely display one of primary colors, which is called spatial division, or each of the pixels may alternately display one of the primary colors at a time, which is called temporal division. A desired color can be recognized by a spatial or temporal sum of the primary colors. An example of the primary colors is three primary colors including red, green, and blue colors. However, four or more primary colors can be used to display images. For color display, each pixel PX includes a color filter displaying each primary color or is supplied with light representing each primary color to be emitted.

Each pixel PX may include a switching element such as a thin film transistor connected to a display signal line, a pixel electrode (not shown) connected thereto, and an opposing electrode (not shown) facing the pixel electrode.

One pixel PX includes a first subpixel PXa and a second subpixel PXb. The first subpixel PXa and the second subpixel PXb display may display luminances according to different gamma curves from each other for one image signal, thereby improving a visibility of the liquid crystal display. The first subpixel PXa and the second subpixel PXb may be arranged in a column direction, as shown in FIG. 1, but is not limited thereto.

A roof layer 360 is formed on the substrate 110.

The roof layer 360 may be formed to be elongated in a pixel row direction. The roof layer 360 is removed at a first valley V1. The first valley V1 may be formed to extend in a pixel row direction along a space between the first subpixel PXa and the second subpixel PXb.

Each roof layer 360 is formed to be separated from the substrate 110 between the adjacent second valleys V2 so as to form a microcavity 305. Further, each roof layer 360 is formed to be attached to the substrate 110 at the second valley V2 so as to cover both sides of the microcavity 305. The second valley V2 may be formed to extend in the pixel column direction along the space between the adjacent pixel columns.

An injection hole 307 is formed at an edge of the first valley V1 to expose the micro cavity disposed under the roof layer 360 to the outside.

The structure of the liquid crystal display according to the present exemplary embodiment is only one example, and numerous variations are possible. For example, an arrangement and a shape of the pixel PX, the first valley V1, and the second valley V2 may be changed, a plurality of roof layers 360 may be connected at the first valley V1, and a portion of the roof layer 360 may be formed to be separated from the substrate 110 in the second valley V2 such that the adjacent microcavities 305 may be connected to each other.

Next, one pixel of the liquid crystal display according to an exemplary embodiment of the inventive concept will be described with reference to FIG. 2 along with FIG. 1.

Figure 2:
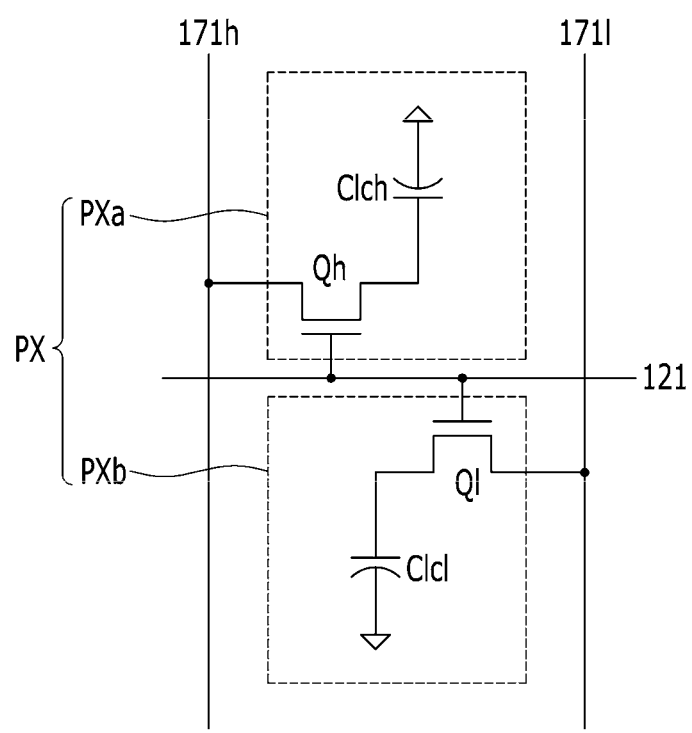
FIG. 2 is an equivalent circuit diagram of one pixel of a liquid crystal display according to an exemplary embodiment of the inventive concept.

Referring to FIG. 2, the liquid crystal display according to an exemplary embodiment of the inventive concept includes a plurality of signal lines 121, 171h, and 171l, and a plurality of pixels PXs connected to the plurality of signal lines 121, 171h, and 171l. The plurality of pixels PXs may be arranged in a matrix form including a plurality of pixel rows and a plurality of pixel columns, but is not limited thereto.

Each pixel PX may include a first subpixel PXa and a second subpixel PXb. The first subpixel PXa and the second subpixel PXb may be disposed in the pixel column direction or the pixel row direction. In this case, as previously described in FIG. 1, the first valley V1 may be disposed between the first subpixel PXa and the second subpixel PXb along the pixel row direction, and the second valley V2 may be disposed between the adjacent pixel columns along the pixel column direction.

The signal lines 121, 171h, and 171l may include a gate line 121 for transmitting a gate signal, and a first data line 171h and a second data line 171l for transmitting different data voltages.

The first subpixel PXa may include a first switching element Qh connected to the gate line 121 and the first data line 171h and a first liquid crystal capacitor Clch connected to the first switching element Qh. The first switching element Qh includes a first terminal connected to the gate line 121, a second terminal connected to the first data line 171h, and a third terminal connected to the first liquid crystal capacitor Clch.

The second subpixel PXb may include a second switching element Ql connected to the gate line 121 and the second data line 171l and a second liquid crystal capacitor Clcl connected to the second switching element Ql. The second switching element Ql includes a first terminal connected to the gate line 121, a second terminal connected to the second data line 171l, and a third terminal connected to the second liquid crystal capacitor Clcl.

If a gate-on voltage Von is firstly applied to the gate line 121, the first switching element Qh and the second switching element Ql connected thereto are turned on, and the first and second liquid crystal capacitors Clch and Clcl are charged up to each data voltage transmitted through the first and second data lines 171h and 171l. The data voltage transmitted by the second data line 171l and the data voltage transmitted by the first data line 171h may be different. For example, the second liquid crystal capacitor Clcl may be charged with the lower voltage than the first liquid crystal capacitor Clch, thereby improving lateral visibility.

The structure of the first subpixel PXa and the second subpixel PXb is not limited to that shown in FIG. 2, and various different methods and structures may be can be used to charge different voltages in the first subpixel PXa and the second subpixel PXb, respectively.

Next, a structure of the liquid crystal display according to an exemplary embodiment of the inventive concept will be described with reference to FIG. 3 to FIG. 5 along with the previously described drawings.

Figure 3:
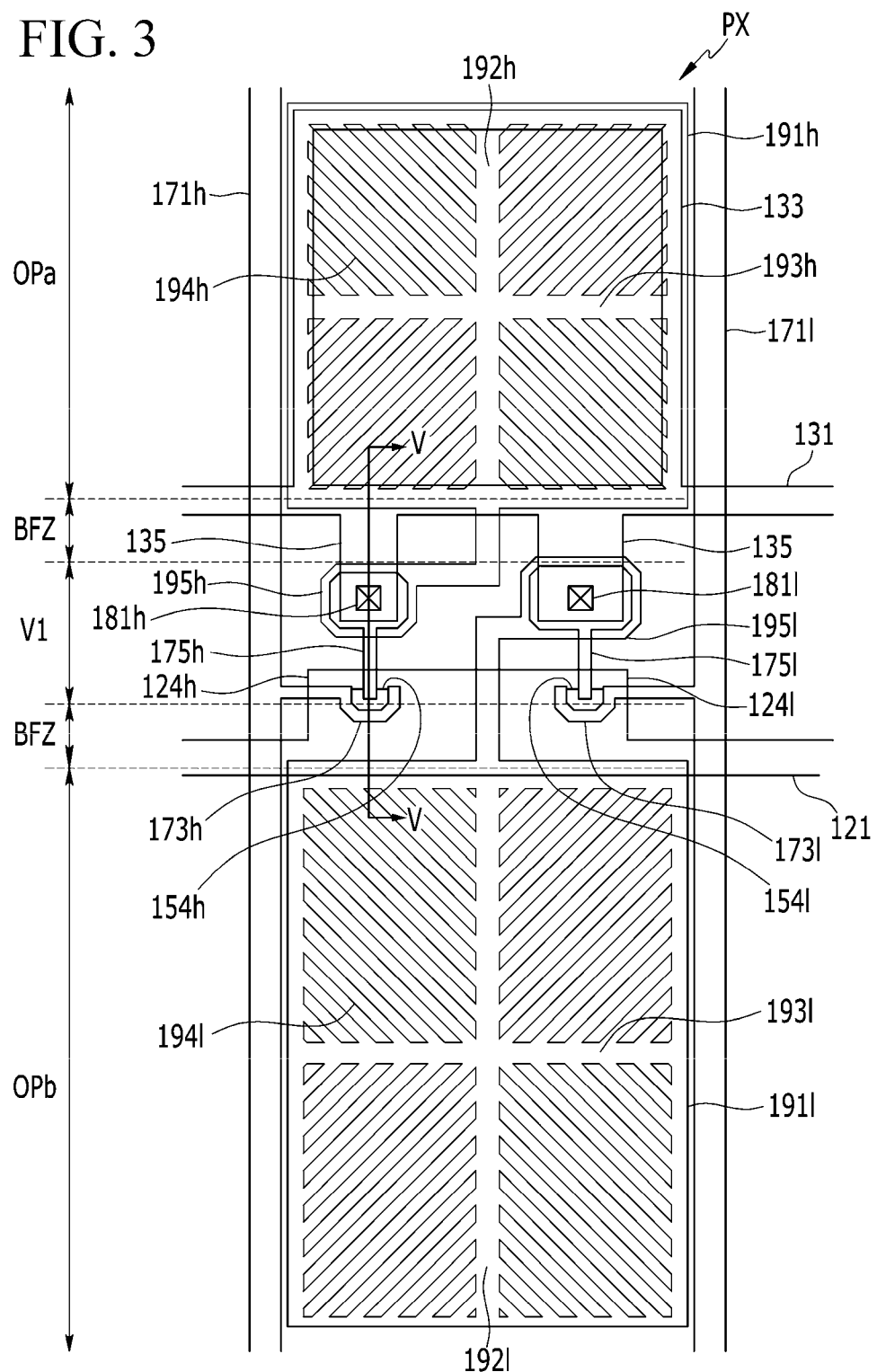
FIG. 3 is a layout view of one pixel of a liquid crystal display according to an exemplary embodiment of the inventive concept.
Figure 4:
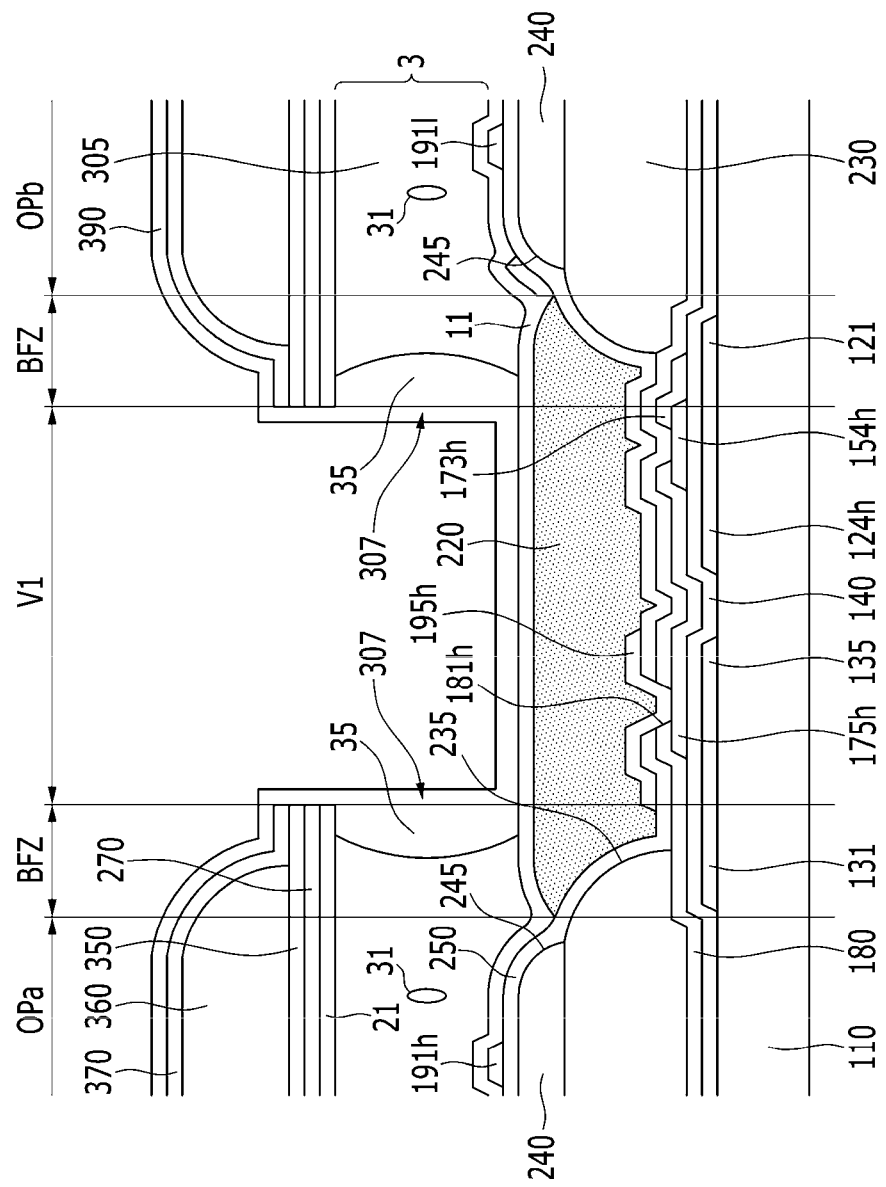
FIG. 4 and FIG. 5 are cross-sectional views of the liquid crystal display of FIG. 3 taken along a line V-V, respectively.
Figure 5:
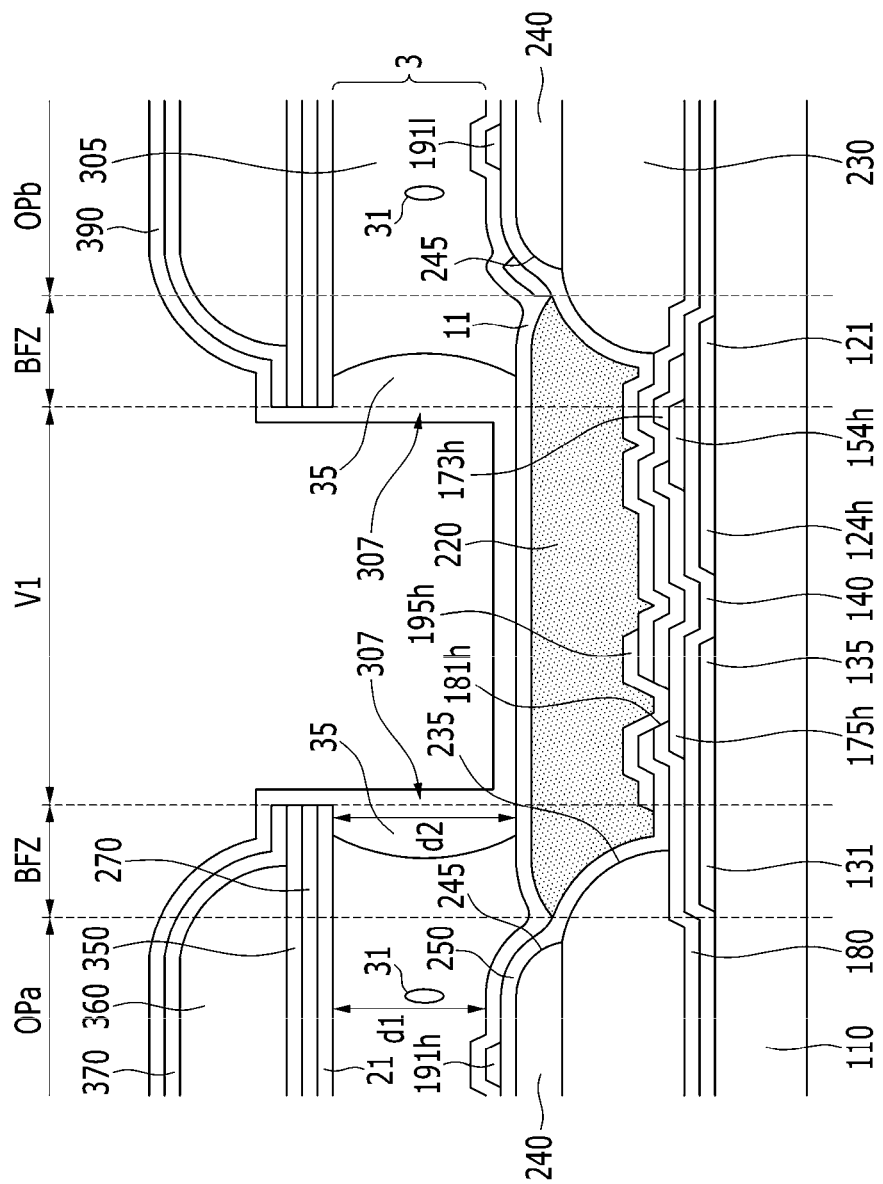

FIG. 3 is a layout view of one pixel of a liquid crystal display according to an exemplary embodiment of the inventive concept, and FIG. 4 and FIG. 5 are cross-sectional views of the liquid crystal display of FIG. 3 taken along a line V-V, respectively.

Referring to FIG. 3 to FIG. 5, a gate conductor including the gate line 121 and a storage electrode line 131 is formed on the substrate 110.

The gate line 121 may extend mainly in a row direction and transmits a gate signal. The gate line 121 may be disposed between two microcavities 305 adjacent in the column direction.

The gate line 121 may include a first gate electrode 124h and a second gate electrode 124l protruding upward. The first gate electrode 124h and the second gate electrode 124l may be connected to each other, thereby forming one protrusion. However, the shape of the first gate electrode 124h and the second gate electrode 124l may vary according to the design of thin film transistor.

The storage electrode line 131 extends in parallel to the gate line 121 and is separated from the gate line 121.

The storage electrode line 131 may include storage electrodes 133 and 135.

The storage electrode 133 connected to the storage electrode line 131 surrounds a light transmitting area OPa that is a transmissive region of the first subpixel PXa.

The storage electrode 135 protrudes downward from the storage electrode line 131 extending in the column direction. FIG. 3 shows an example in which the storage electrode line 131 includes a pair of storage electrodes 135 for one pixel PX. The pair of storage electrode 135 may be respectively formed to be close to the first gate electrode 124h and the second gate electrode 124l.

A gate insulating layer 140 is formed on the gate conductor. The gate insulating layer 140 may be made of an inorganic insulating material such as a silicon nitride ($SiN_x$) or a silicon oxide ($SiO_x$). The gate insulating layer 140 may be formed of a single layer or a multilayer.

A first semiconductor 154h and a second semiconductor 154l are formed on the gate insulating layer 140. The first semiconductor 154h may be disposed on the first gate electrode 124h, and the second semiconductor 154l may be disposed on the second gate electrode 124l.

The first semiconductor 154h and the second semiconductor 154l may include amorphous silicon, polycrystalline silicon, or an oxide semiconductor.

Ohmic contacts (not shown) may be further formed on the first semiconductor 154h and the second semiconductor 154l. The ohmic contacts may be formed on the first semiconductor 154h, and they may be formed of a material such as n+ hydrogenated amorphous silicon in which an n-type impurity is doped at a high concentration, or of a silicide.

A data conductor including a plurality of data lines such as a first data line 171h and a second data line 171l, a plurality of first drain electrodes 175h, and a plurality of second drain electrodes 175l is formed on the first semiconductor 154h, the second semiconductor 154l, and the gate insulating layer 140.

The first data line 171h and the second data line 171l transmit a data signal and extend mainly in a column direction, thereby intersecting the gate line 121 and the storage electrode line 131. The first data line 171h or the second data line 171l may be disposed between two microcavities 305 adjacent in the row direction.

The first data line 171h and the second data line 171l may transmit the different data voltages. For example, the data voltage transmitted by the second data line 171l for one image may be lower than the data voltage transmitted by the first data line 171h, but is not limited thereto.

The first data line 171h may include a first source electrode 173h protruding toward the first gate electrode 124h, and the second data line 171l may include a second source electrode 173l protruding toward the second gate electrode 124l.

The first drain electrode 175h and second drain electrode 175l have one wide end and one rod-shape end, respectively. The wide end of the first drain electrode 175h and the second drain electrode 175l may overlap the storage electrode 135 protruded under the storage electrode line 131. The rod-shape end of the first drain electrode 175h and the second drain electrode 175l may be partially enclosed by the first source electrode 173h and the second source electrode 173l.

The first and second gate electrodes 124h and 124l, the first and second source electrodes 173h and 173l, and the first and second drain electrodes 175h and 175l respectively form first and second thin film transistors (TFTs) along with the first and second semiconductors 154h and 154l, and channels of the thin film transistors are formed in the semiconductors 154h and 154l between the source electrodes 173h and 173l and the drain electrodes 175h and 175l facing each other. The first and second thin film transistors may function as the described first and second switching elements Qh and Ql.

A passivation layer 180 is disposed on the data conductor. The passivation layer 180 may be made of the organic insulating material or the inorganic insulating material, and may be formed of a single layer or a multilayer.

A color filter 230 is disposed on the passivation layer 180. Each color filter 230 may display one color among the plurality of primary colors such as three primary colors of red, green, and blue, and four or more primary colors. The color filter 230 is not limited to the three primary colors of red, green, and blue, and may also be cyan, magenta, yellow, and white-based colors.

Each color filter 230 may be elongated in the column direction. At least the color filter 230 on a region between the light transmitting area OPa of the first subpixel PXa and the light transmitting area OPb of the second subpixel PXb may be removed. For example, at least the color filter on the region where the first and second thin film transistors are formed may be removed, thereby forming an opening 235.

A first insulating layer 240 may be further formed on the color filter 230. The first insulating layer 240 may be formed of the organic insulating material, and an upper surface thereof may be flat. The first insulating layer 240 may be omitted, if necessary.

At least the first insulating layer 240 on a region between the light transmitting area OPa of the first subpixel PXa and the light transmitting area OPb of the second subpixel PXb may be removed. For example, at least the first insulating layer 240 on a region where the first and second thin film transistors are formed may be removed, thereby forming an opening 245. An edge of the opening 245 may be approximately aligned with an edge of the light transmitting area OPa of the first subpixel PXa or the light transmitting area OPb of the second subpixel PXb. The opening 245 of the first insulating layer 240 may be wider than the opening 235 of the color filter 230. The edge of the opening 245 may be formed on the color filter 230 and be formed on the light transmitting area OPa of the first subpixel PXa and the light transmitting area OPb of the second subpixel PXb.

A second insulating layer 250 may be further formed on the first insulating layer 240. The second insulating layer 250 may be made of the inorganic insulating material. The second insulating layer 250 functions protecting the color filter 230 and the first insulating layer 240. If necessary, the second insulating layer 250 may be omitted.

The passivation layer 180 and the second insulating layer 250 have a first contact hole 181h exposing the wide end of the first drain electrode 175h and a second contact hole 181l exposing the wide end of the second drain electrode 175l. The first contact hole 181h and the second contact hole 181l may be disposed within the opening 235 of the color filter 230.

A plurality of pixel electrodes including a first subpixel electrode 191h and a second subpixel electrode 191l are formed on the second insulating layer 250.

The first subpixel electrode 191h and the second subpixel electrode 191l may be disposed on an upper portion and a lower portion of the first and second thin film transistors, respectively. The first subpixel electrode 191h may be disposed corresponding to the light transmitting area OPa of the first subpixel PXa, and the second subpixel electrode 191l may be disposed corresponding to the light transmitting area OPb of the second subpixel PXb. However, the arrangement and the shape of the first subpixel electrode 191h and the second subpixel electrode 191l are not limited thereto and may vary according to the design of the pixel electrodes.

The overall shape of the first subpixel electrode 191h and the second subpixel electrode 191l may be quadrangular. The first subpixel electrode 191h and the second subpixel electrode 191l may include cross-shaped stems formed of transverse stems 193h and 193l and longitudinal stems 192h and 192l, a plurality of minute branches 194h and 194l extending from the cross-shaped stems to the edge of the pixel, and pads 195h and 195l extending over the first contact hole 181h and the second contact hole 181l.

The first subpixel electrode 191h and the second subpixel electrode 191l may be divided into four subregions by the transverse stems 193h and 193l and the longitudinal stems 192h and 192l. The minute branches 194h and 194l obliquely extend from the transverse stems 193h and 193l and the longitudinal stems 192h and 192l, and the extending direction thereof may form an angle of approximately 45 degrees or 135 degrees with respect to the gate line 121 or the transverse stems 193h and 193l. The extending directions of the minute branches 194h and 194l of the adjacent subregions may be perpendicular each other.

The first subpixel electrode 191h and the second subpixel electrode 191l may further include an outer stem (not shown) connecting the approximate outer part of the light transmitting area OPa of the first subpixel PXa, and light transmitting area OPb of the second subpixel PXb.

The pad 195h of the first subpixel electrode 191h is connected to the first drain electrode 175h through the first contact hole 181h, and the pad 195l of the second subpixel electrode 191l is connected to the second drain electrode 175l through the second contact hole 181l. Accordingly, if the first thin film transistor and second thin film transistor are turned on, the first subpixel electrode 191h and the second subpixel electrode 191l may receive the data voltages from the first drain electrode 175h and the second drain electrode 175l, respectively.

The first subpixel electrode 191h and the second subpixel electrode 191l may include a transparent conductive material such as indium tin oxide (ITO), indium zinc oxide (IZO), and a metal thin film.

The arrangement and the shape of the pixel PX, the structure of the thin film transistor, and the shape of the pixel electrode are only one example in the present exemplary embodiment, and numerous variations are possible.

A light blocking member 220 may be disposed on the pixel electrode. The light blocking member 220 includes a portion disposed between the light transmitting areas of the adjacent pixels PXs or between the light transmitting area OPa of the first subpixel PXa and the light transmitting area OPb of the second subpixel PXb, thereby preventing light leakage between the pixels PXs or light leakage between the first subpixel PXa and the second subpixel PXb.

In detail, the light blocking member 220 may include a portion extending in the row direction and a portion extending in the column direction. The portion extending in the row direction in the light blocking member 220 may cover the gate line 121 and the first and second thin film transistors, and the portion extending in the column direction may extend along with the first and second data lines 171h and 171l.

Referring to FIG. 4, the upper surface of the light blocking member 220 disposed between the light transmitting area OPa of the first subpixel PXa and the light transmitting area OPb of the second subpixel PXb may be lower than the upper surface of the first and second subpixel electrodes 191*h* and 191*l* or the second insulating layer 250 disposed at the light transmitting area OPa of the first subpixel PXa and the light transmitting area OPb of the second subpixel PXb. The light blocking member 220 may directly contact the pads 195*h* and 195*l* in the first valley V1.

The light blocking member 220 may overlap the edge of the color filter 230. The light blocking member 220 may not overlap the first insulating layer 240.

The position of the light blocking member 220 and the color filter 230 is not limited in the drawing and may vary. For example, the light blocking member 220 may be disposed under the second insulating layer 250 or the first insulating layer 240 or may be disposed in the same plane as the color filter 230.

An opposing electrode 270 is formed on the first and second subpixel electrodes 191*h* and 191*l* to be separated therefrom by a predetermined distance.

The opposing electrode 270 may include the transparent conductive material such as ITO, IZO, or the metal thin film. The opposing electrode 270 may be applied with a predetermined voltage such as a common voltage.

The space between the first and second subpixel electrode 191*h* and 191*l* and the opposing electrode 270 forms the microcavity 305. In the microcavity 305, a liquid crystal material including liquid crystal molecules 31 is filled to form a liquid crystal layer 3.

The liquid crystal molecules 31 may have negative dielectric anisotropy and may be aligned in the direction perpendicular to the substrate 110 in the absence of an electric field, but are not limited thereto.

The first subpixel electrode 191*h* and the second subpixel electrode 191*l* receive the data voltages to form an electric field together with the opposing electrode 270 applied with the common voltage, to thereby determine an orientation of liquid crystal molecules 31 disposed inside the microcavity 305. Accordingly, the luminance of the light transmitted through the liquid crystal layer 3 differs depending on the orientation of the liquid crystal molecules 31 which altered by the electric field applied to the liquid crystal molecules 31.

A third insulating layer 350 may be further disposed on the opposing electrode 270. The third insulating layer 350 may be made of an inorganic insulating material such as a silicon nitride ($SiN_x$), a silicon oxide ($SiO_x$), and a silicon oxynitride ($SiO_xN_y$), or is omitted as necessary.

The roof layer 360 is formed on the third insulating layer 350. The roof layer 360 may be made of an organic material. The shape of the microcavity 305 may be maintained by hardening the roof layer 360 with a curing process. The roof layer 360 is formed to be spaced apart from the first and second subpixel electrodes 191*h* and 191*l* with the microcavity 305 therebetween.

The roof layer 360 may be mainly disposed at the light transmitting area OPa of the first subpixel PXa and the light transmitting area OPb of the second subpixel PXb.

A fourth insulating layer 370 may be further formed on the roof layer 360. The fourth insulating layer 370 may be made of an inorganic insulting material such as a silicon nitride ($SiN_x$), a silicon oxide ($SiO_x$), and a silicon oxynitride ($SiO_xN_y$). The fourth insulating layer 370 may be formed to cover the upper surface and the side surface of the roof layer 360. The fourth insulating layer 370 has a function of protecting the roof layer 360. The fourth insulating layer 370 may be omitted.

A first alignment layer 11 may be formed on the light blocking member 220, the first and second pixel electrodes 191*h* and 191*l*, and the second insulating layer 250. A second alignment layer 21 facing the first alignment layer 11 may be formed under the opposing electrode 270. The first alignment layer 11 and the second alignment layer 21 may be vertical alignment layers, and may include an alignment material such as polyamic acid, polysiloxane, and polyimide. The first and second alignment layers 11 and 21 may be connected to each other at the edge of the pixel PX.

The opposing electrode 270, the third insulating layer 350, and the fourth insulating layer 370 are disposed to be spaced apart from the first and second subpixel electrodes 191*h* and 191*l*. The layers disposed under or on the roof layer 360 are removed along with the roof layer 360 at the region between the light transmitting area OPa of the first subpixel PXa and the light transmitting area OPb of the second subpixel PXb thereby forming the first valley V1 exposing the microcavity 305.

Referring to FIG. 1 and FIG. 4, the roof layer 360 extends along the pixel row and is formed at each pixel PX and the second valley V2, but is not formed at the first valley V1. That is, the roof layer 360 is not disposed on a region between the light transmitting area OPa of the first subpixel PXa and the light transmitting area OPb of the second subpixel PXb.

The microcavity 305 is disposed under the roof layer 360, however the microcavity 305 may not be formed under the roof layer 360 formed on the second valley V2.

A buffer zone BFZ is disposed between the first valley V1 and the light transmitting area OPa of the first subpixel PXa or the light transmitting area OPb of the second subpixel PXb according to an exemplary embodiment of the inventive concept. That is, the buffer zone BFZ is disposed at the edge where the injection hole 307 is disposed among the edge of the first valley V1. The buffer zone BFZ may overlap the light blocking member 220 and may mainly overlap the edge of the light blocking member 220. Accordingly, the light blocking member 220 according to an exemplary embodiment of the inventive concept may include the portion overlapping the first valley V1 and the buffer zone BFZ, and the light transmitting area OPa of the first subpixel PXa and the light transmitting area OPb of the second subpixel PXb does not overlap the light blocking member 220.

The light blocking member 220 may include the portion overlapping the second valley V2 shown in FIG. 1.

Referring to FIG. 4, the upper surface of the first alignment layer 11 disposed at the buffer zone BFZ is lower than the upper surface of the first alignment layer 11 disposed at the light transmitting area OPa of the first subpixel PXa or the light transmitting area OPb of the second subpixel PXb.

Accordingly, as shown in FIG. 5, in the buffer zone BFZ, a height d2 of the microcavity 305 may be higher than the height d1 of the microcavity 305 at the light transmitting area OPa of the first subpixel PXa or the light transmitting area OPb of the second subpixel PXb. That is, in the buffer zone BFZ, the distance between the first alignment layer 11 and the second alignment layer 21 may be larger than the distance between the first alignment layer 11 and the second alignment layer 21 in the light transmitting areas OPa and OPb. For this, in the present exemplary embodiment, the first insulating layer 240 may be removed in the buffer zone BFZ and the first valley V1. That is, the edge of the opening 245 of the first insulating layer 240 may approximately accord with the boundary between the buffer zone BFZ and the light transmitting areas OPa and OPb, or may be disposed in the light transmitting areas OPa and OPb.

The injection hole 307 exposing the portion of the microcavity 305 is formed at the space under the edge of the opposing electrode 270, the third insulating layer 350, and the fourth insulating layer 370 forming the edge of the first valley V1. Injection holes 307 may face each other at the edge of the buffer zone BFZ adjacent to the light transmitting area OPa of the first subpixel PXa and the edge of the buffer zone BFZ adjacent to the light transmitting area OPb of the second subpixel PXb. That is, the injection hole 307 may expose the side surface of the microcavity 305 at a lower edge of the first subpixel PXa and an upper edge of the second subpixel PXb. The microcavity 305 is exposed by the injection hole 307 such that an alignment material or a liquid crystal material may be injected into the microcavity 305 through the injection hole 307 in the manufacturing process of the liquid crystal display.

An overcoat 390 covering the injection hole 307 may be disposed on the fourth insulating layer 370. The overcoat 390 may seal the microcavity 305 for the liquid crystal material including the liquid crystal molecules 31 injected into the microcavity 305 to not be leaked to the outside. The overcoat 390 contacts the liquid crystal material such that it is preferable that the overcoat 390 may be made of a material which does not react with the liquid crystal material. For example, the overcoat 390 may be formed of parylene.

The overcoat 390 may be made of a multilayer such as a dual layer or a triple layer. The dual layer includes two layers made of different materials. The triple layer includes three layers, and materials of two adjacent layers are different from each other. For example, the overcoat 390 may include a layer made of the organic insulating material and a layer made of the inorganic insulating material.

Although not shown, a polarizer may be further disposed on an upper surface and a lower surface of the liquid crystal display. The polarizer may include a first polarizer and a second polarizer. The first polarizer may be attached at the lower surface of the substrate 110, and the second polarizer may be attached on the overcoat 390.

Next, a manufacturing method of the liquid crystal display according to an exemplary embodiment of the inventive concept will be described with reference to FIG. 6 to FIG. 20 along the described drawings.

FIG. 6 to FIG. 20 are cross-sectional views of a structure in an intermediate step in a process according to a manufacturing method of a liquid crystal display according to an exemplary embodiment of the inventive concept.

Figure 6:
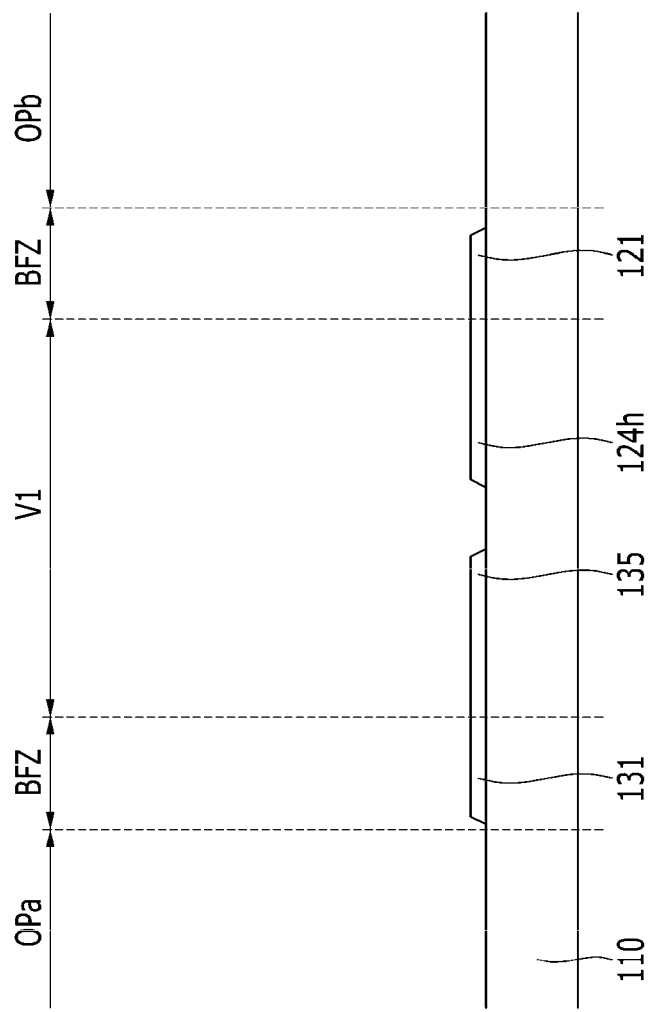
FIG. 6 to FIG. 20 are cross-sectional views of a structure in an intermediate step in a process according to a manufacturing method of a liquid crystal display according to an exemplary embodiment of the inventive concept.

Firstly, referring to FIG. 6, a conductive material is deposited and patterned on a substrate 110 made of glass or plastic to form a gate conductor including a plurality of gate lines 121 including first and second gate electrodes 124h and 124l and a storage electrode line 131 including storage electrodes 133 and 135.

Figure 7:
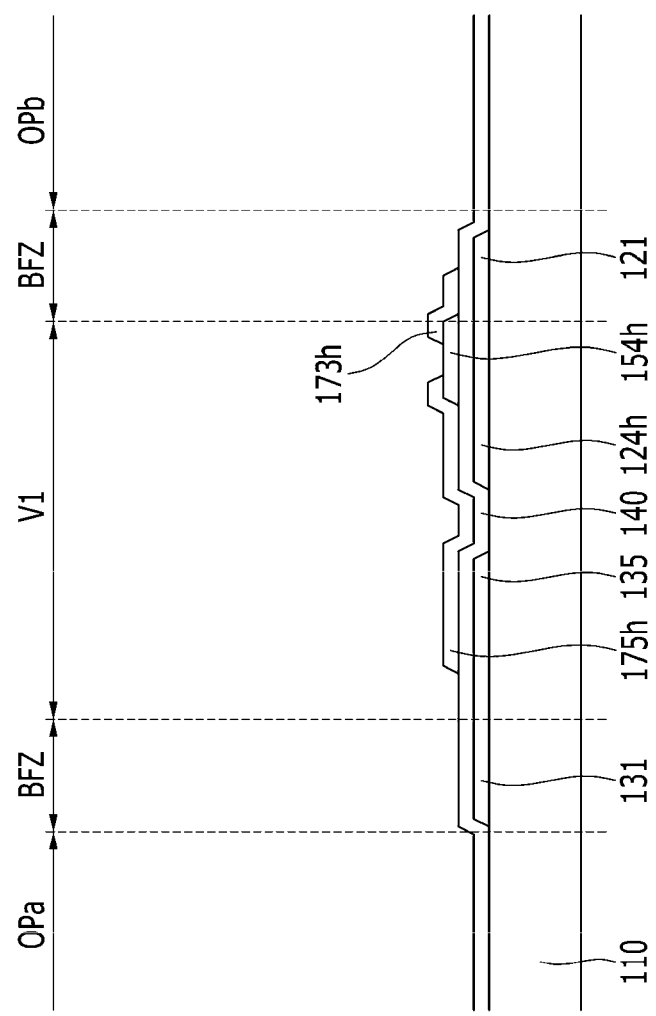

Next, referring to FIG. 7, an inorganic insulating material such as a silicon oxide ($SiO_x$) or a silicon nitride ($SiN_x$) is deposited on the gate conductor and the substrate 110 to form a gate insulating layer 140. The gate insulating layer 140 may be formed of the single layer or the multilayer.

Next, on the gate insulating layer 140, a semiconductor material such as amorphous silicon, polycrystalline silicon, and an oxide semiconductor is deposited and patterned to form a first semiconductor 154h and a second semiconductor 154l. The first semiconductor 154h is formed to be disposed on the first gate electrode 124h, and the second semiconductor 154l is formed to be disposed on the second gate electrode 124l.

Next, a conductive material is deposited and patterned to form a data conductor including a first data line 171h including a first source electrode 173h, a second data line 171l including a second source electrode 173l, and first and second drain electrodes 175h and 175l.

Alternatively, the semiconductor material and the data conductor metal material are sequentially deposited and patterned through photolithography using one photomask to form the first and second semiconductors 154h and 154l and the data conductor.

Figure 8:
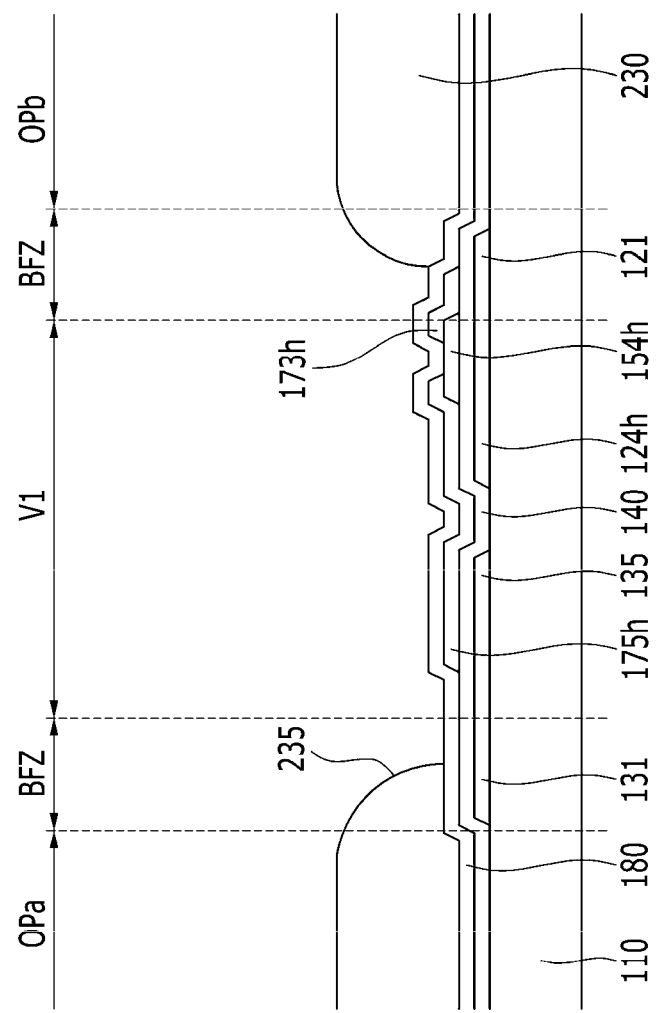

Next, referring to FIG. 8, an inorganic insulating material or an organic insulating material is deposited on the data conductor to form a passivation layer 180.

Next, a plurality of color filters 230 are formed on the passivation layer 180. At least the color filter 230 on a region between the light transmitting area OPa of the first subpixel PXa and the light transmitting area OPb of the second subpixel PXb may be removed. For example, at least the color filter on the region where the first and second thin film transistors are formed may be removed, thereby forming an opening 235.

Figure 9:
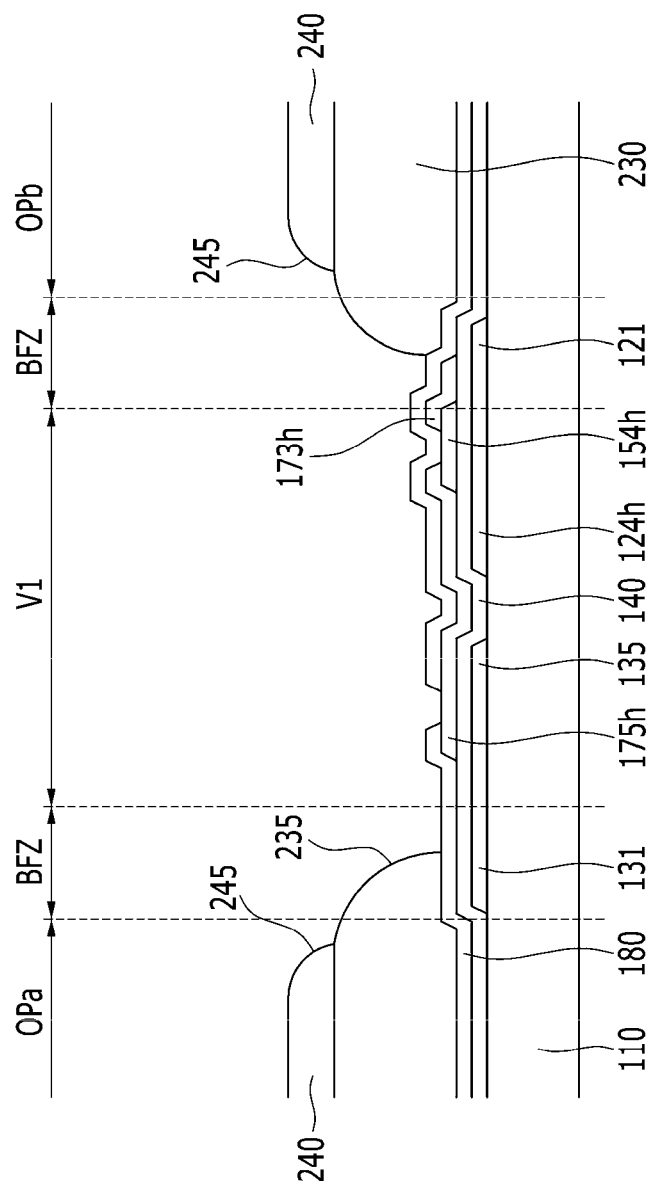

Next, referring to FIG. 9, the organic insulating material is deposited on the color filter 230 to form a first insulating layer 240. At least the first insulating layer 240 on the region between the light transmitting area OPa of the first subpixel PXa and the light transmitting area OPb of the second subpixel PXb may be removed. For example, at least the first insulating layer on the region where the first and second thin film transistors are formed may be removed, thereby forming an opening 245. The edge of the opening 245 of the first insulating layer 240 may be disposed on the color filter 230, that is, the width of the opening 245 is greater than the distance between adjacent color filters. The edge of the opening 245 may correspond to a boundary between the light transmitting areas, OPa and OPb, and the buffer zone BFZ, or may be formed in the light transmitting areas, OPa or OPb.

Figure 10:
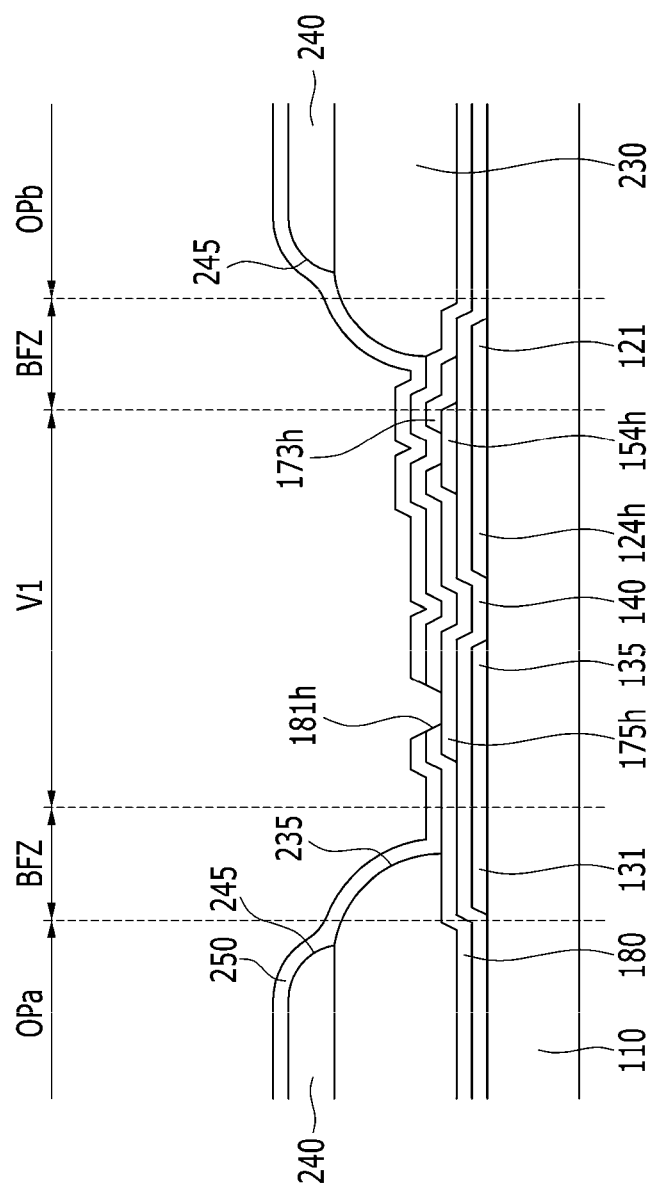

Next, referring to FIG. 10, an inorganic insulating material such as a silicon nitride ($SiN_x$), a silicon oxide ($SiO_x$), and a silicon oxynitride ($SiO_xN_y$) is deposited on the first insulating layer 240 to form a second insulating layer 250.

Next, the passivation layer 180 and the second insulating layer 250 are patterned to form a first contact hole 181h exposing the wide end of the first drain electrode 175h and a second contact hole 181l exposing the wide end of the second drain electrode 175l. The first contact hole 181h and the second contact hole 181l may be disposed within the opening 235 of the color filter 230.

Figure 11:
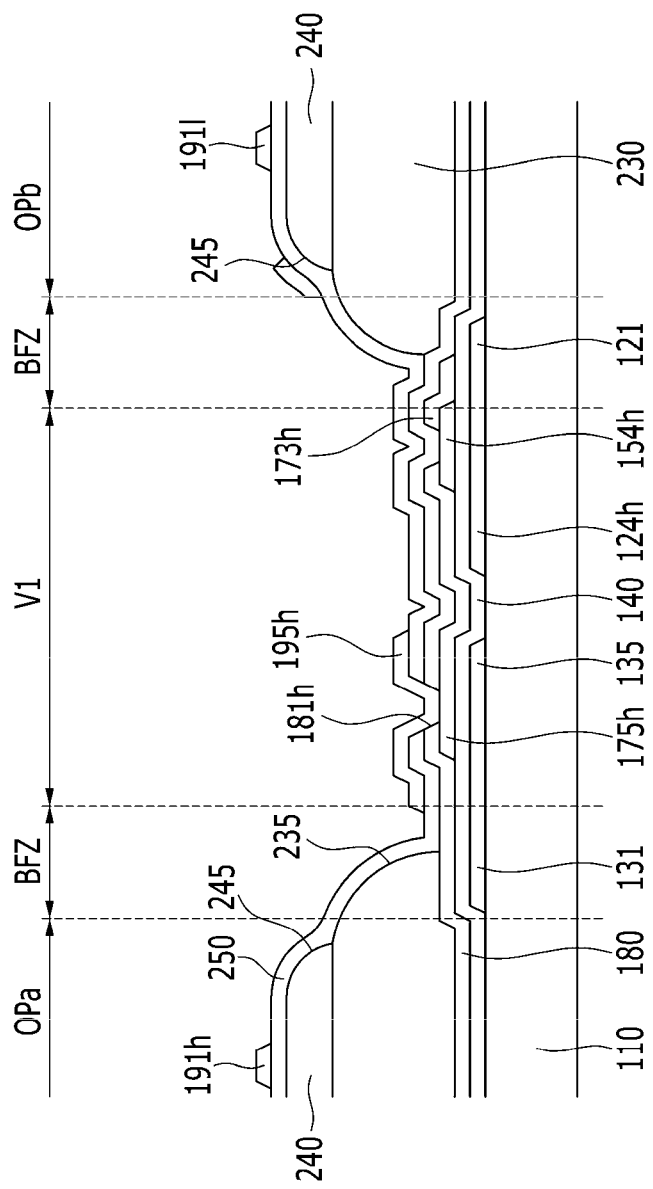

Next, referring to FIG. 11, the transparent conductive material such as ITO, IZO, or a metal thin film is deposited and patterned on the second insulating layer 250 to form a plurality of pixel electrodes including a first subpixel electrode 191h and a second subpixel electrode 191l. The first subpixel electrode 191h may include a protrusion 195h connected to the first drain electrode 175h through the first contact hole 181h, and the second subpixel electrode 191l may include a protrusion 195l connected to the second drain electrode 175l through the second contact hole 181l.

Figure 12:
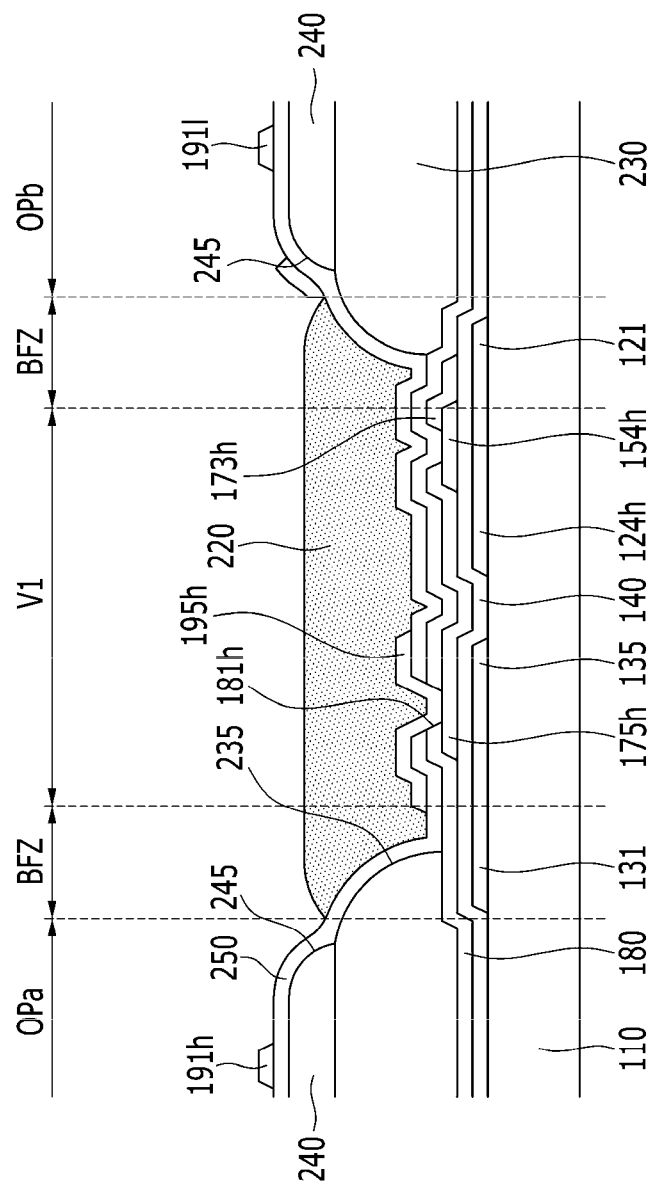

Next, referring to FIG. 12, a light blocking member 220 is formed on the pixel electrode. The light blocking member 220 may include portion disposed between the light transmitting areas of the adjacent pixels PX or between the light transmitting area OPa of the first subpixel PXa and the light transmitting area OPb of the second subpixel PXb. In this case, the upper surface of the light blocking member 220 disposed between the light transmitting area OPa of the first subpixel PXa and the light transmitting area OPb of the second subpixel PXb may be lower than the upper surface of the first and second subpixel electrodes 191h and 191l or the second insulating layer 250 disposed at the light transmitting area OPa of the first subpixel PXa and the light transmitting area OPb of the second subpixel PXb.

Figure 13:
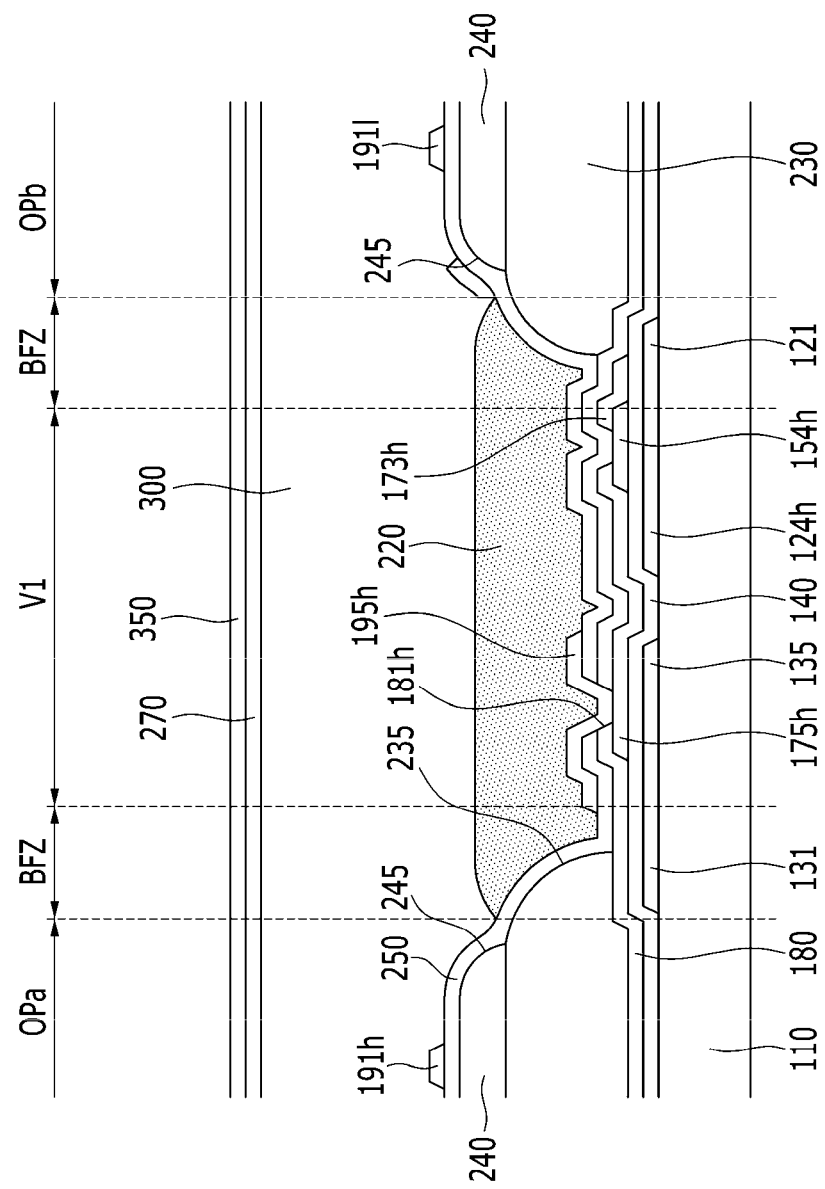

Next, referring to FIG. 13, a photosensitive organic material is coated on the first and second subpixel electrodes 191h and 191l and a sacrificial layer 300 is formed through a photo-process. The sacrificial layer 300 is continuously formed along a plurality of pixel columns. The sacrificial layer 300 may cover the pixel PX and may be removed at the second valley V2 through the photo-process.

Next, the conductive material such as ITO, IZO, and the metal thin film is deposited on the sacrificial layer 300 to form an opposing electrode 270.

The inorganic insulating material such as a silicon nitride ($SiN_x$), a silicon oxide ($SiO_x$), and a silicon oxynitride ($SiO_xN_y$) is then deposited on the opposing electrode 270 to form a third insulating layer 350.

Figure 14:
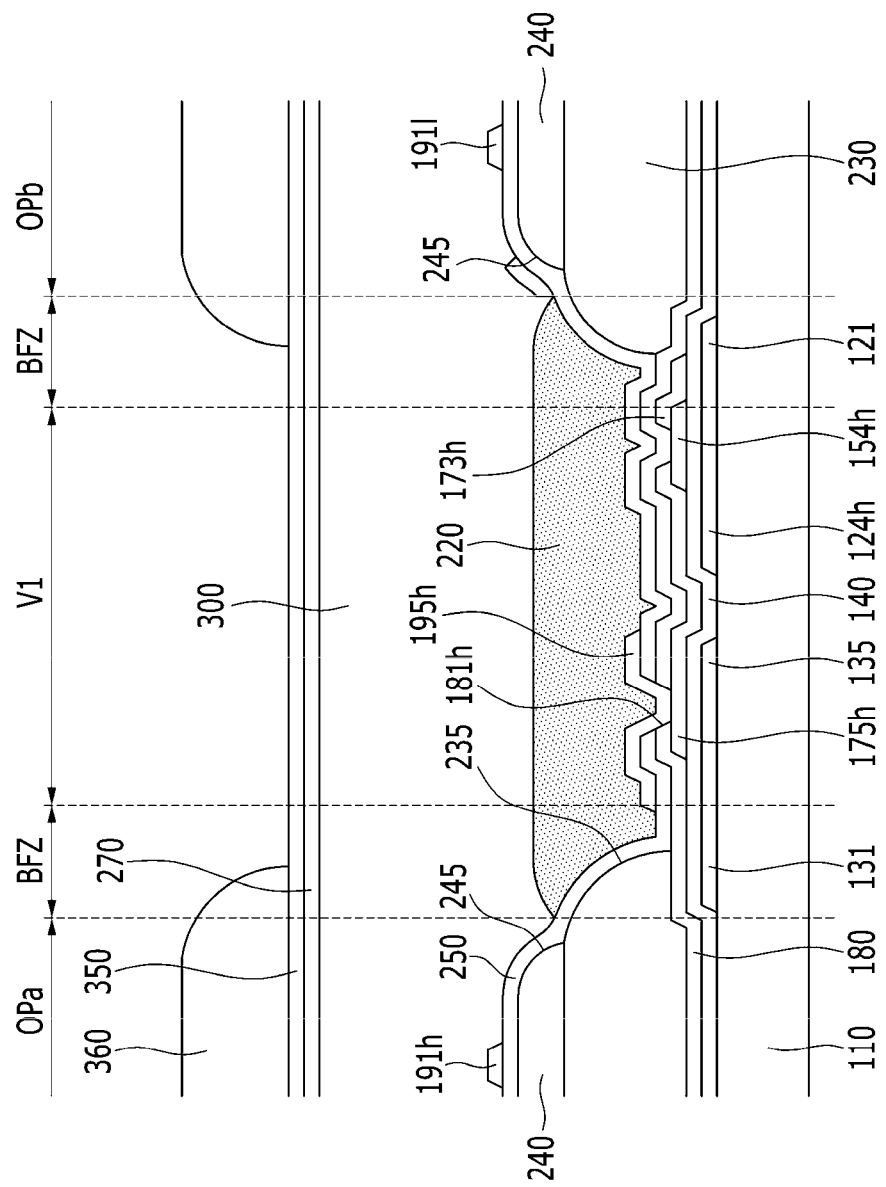

Next, referring to FIG. 14, an organic material is coated and patterned on the third insulating layer 350 to form a roof layer 360. The roof layer 360 may be mainly disposed at the light transmitting area OPa of the first subpixel PXa and the light transmitting area OPb of the second subpixel PXb. The region between the separated roof layers 360 for one pixel PX may correspond to the first valley V1 formed later. The roof layer 360 may be formed to have a shape that extends along the pixel row.

Figure 15:
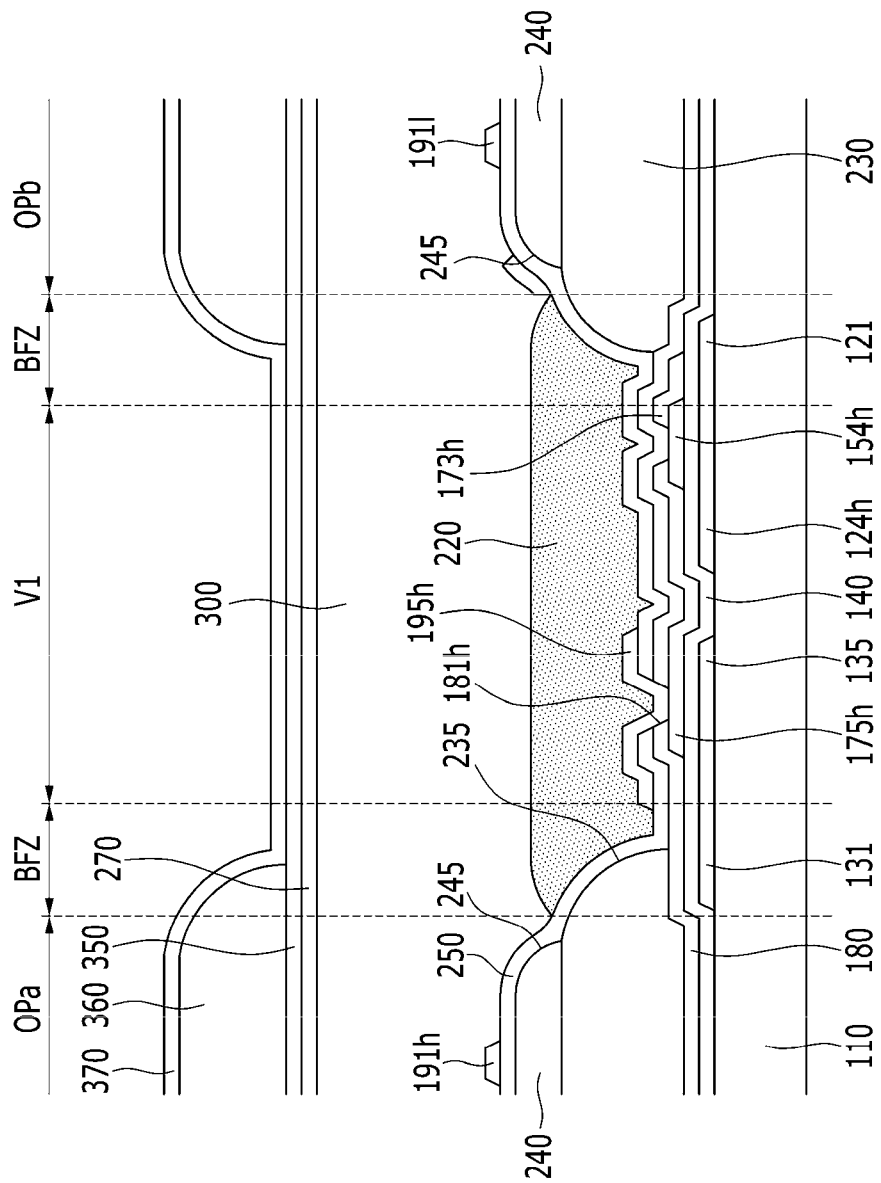

Next, referring to FIG. 15, the inorganic insulating material such as a silicon nitride ($SiN_x$) and a silicon oxide ($SiO_x$) is deposited on the roof layer 360 and the third insulating layer 350 to form a fourth insulating layer 370. The fourth insulating layer 370 is formed on the patterned roof layer 360 thereby protecting the side surface of the roof layer 360.

Figure 16:
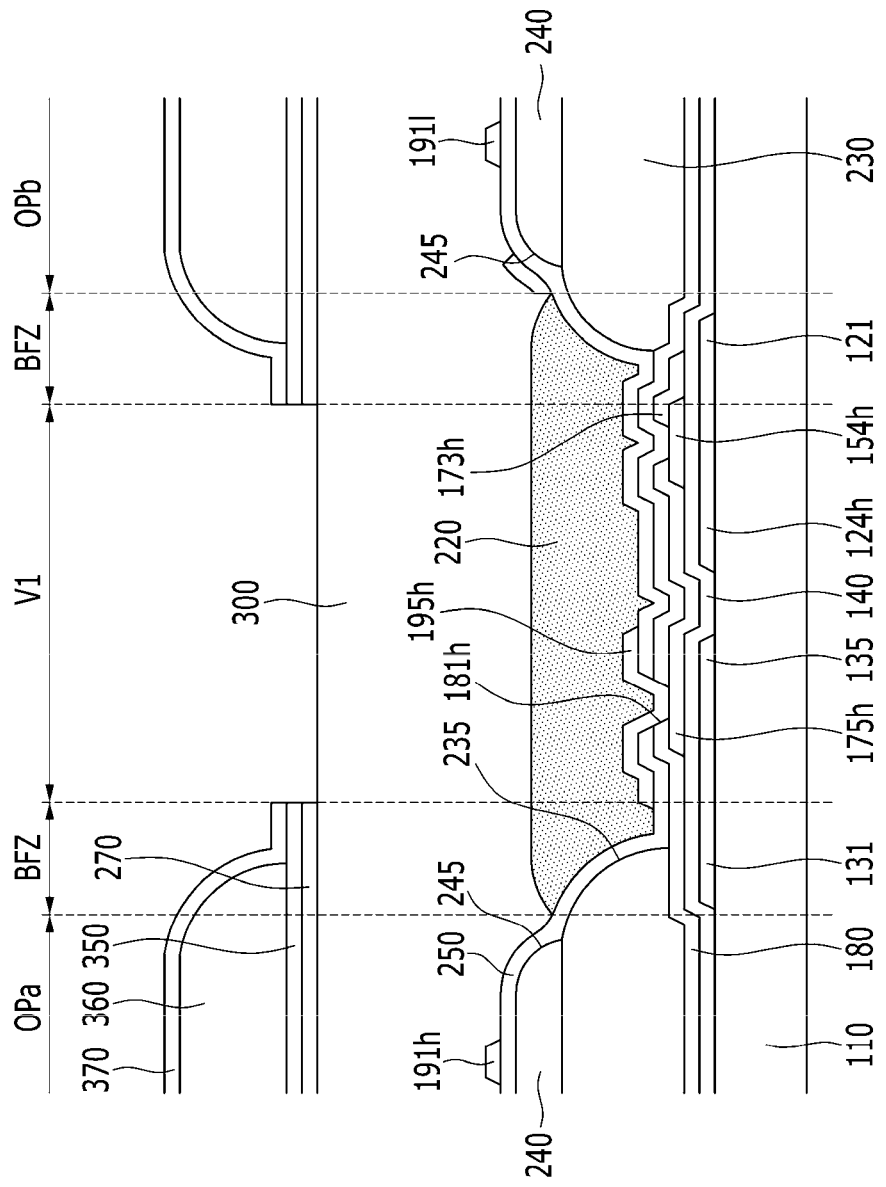

Next, referring to FIG. 16, the fourth insulating layer 370, the third insulating layer 350, and the opposing electrode 270 are patterned to form the first valley V1. Accordingly, the sacrificial layer 300 is exposed at the first valley V1.

Figure 17:
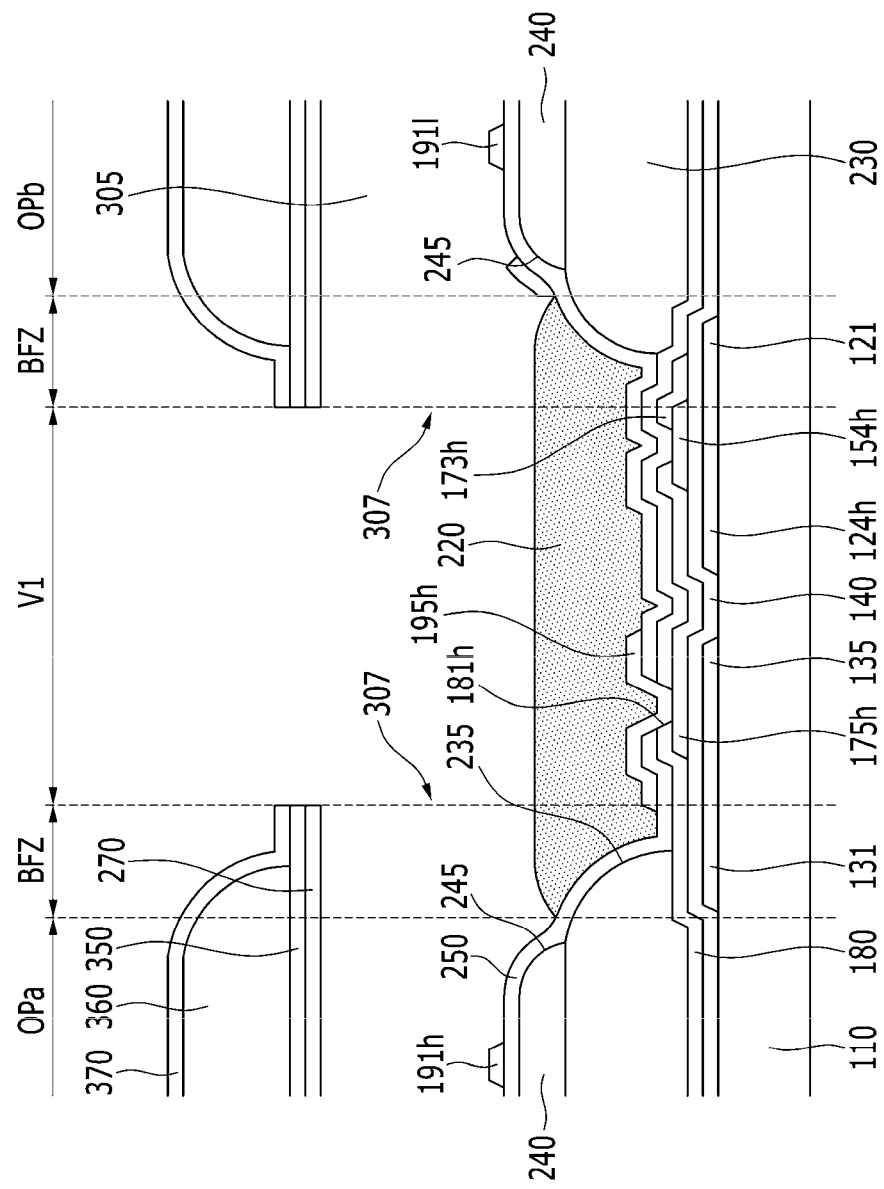

Next, referring to FIG. 17, oxygen plasma process for ashing is performed on the substrate 110 to which the sacrificial layer 300 is exposed or a developing process is performed to remove the sacrificial layer 300. If the sacrificial layer 300 is removed, a microcavity 305 is generated at the position corresponding to a region in which the sacrificial layer 300 is removed by the oxygen plasma process or the developing process.

The first and second subpixel electrodes 191h and 191l and the opposing electrode 270 are separated from each other by the microcavity 305 interposed therebetween, and the first and second subpixel electrodes 191h and 191l and the roof layer 360 are separated from each other by the microcavity 305 interposed therebetween. The opposing electrode 270 and the roof layer 360 are formed to cover the upper surface and opposing side surfaces of the microcavity 305.

The microcavity 305 may be exposed through the first valley V1, and the edge of the opposing electrode 270, the third insulating layer 350, and the fourth insulating layer 370 forming the edge of the first valley V1 is referred to as an injection hole 307. The injection hole 307 may be formed along the first valley V1. Alternatively, the injection hole 307 may be formed along the second valley V2.

Next, heat is applied to the substrate 110 to harden the roof layer 360. Accordingly, the roof layer 360 may maintain the shape of the microcavity 305.

A buffer zone BFZ is disposed between the first valley V1 and the light transmitting area OPa of the first subpixel PXa or the light transmitting area OPb of the second subpixel PXb.

Figure 18:
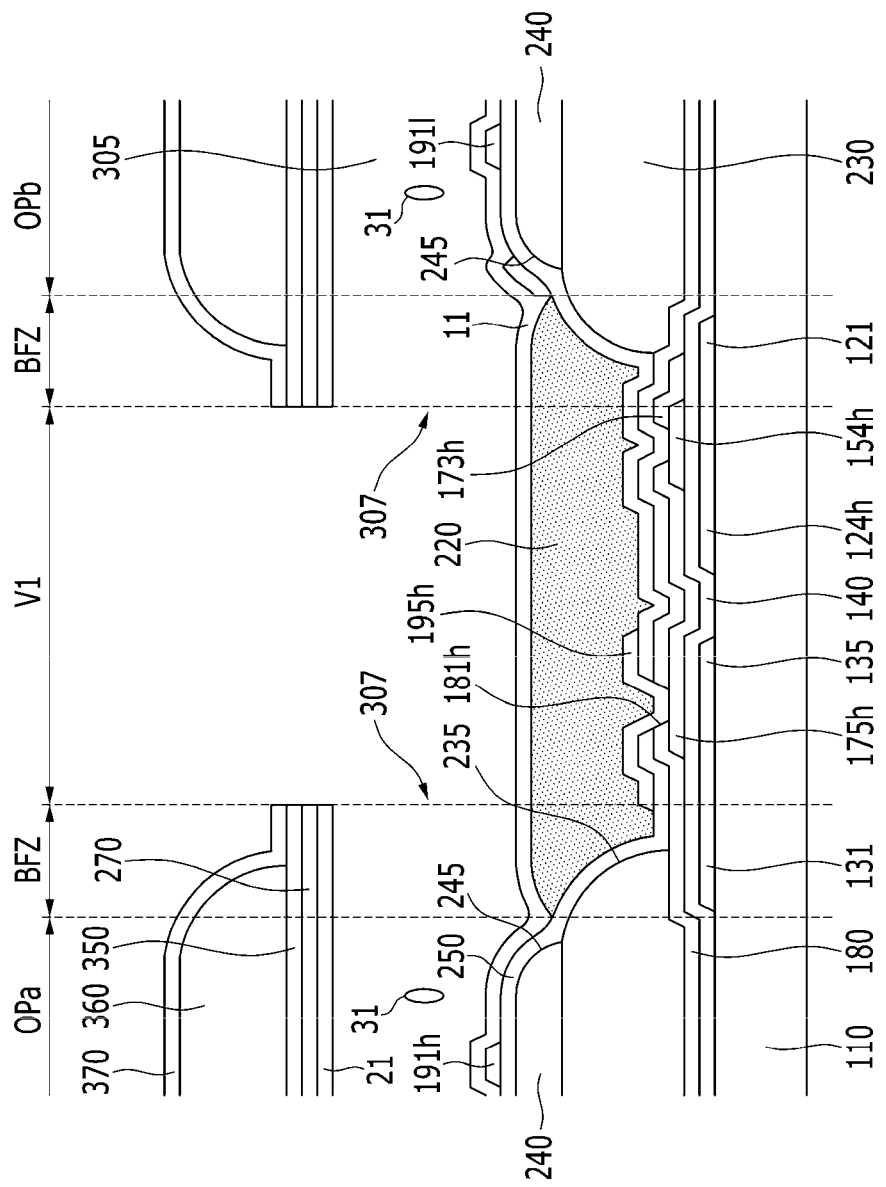

Next, referring to FIG. 18, an aligning agent including an alignment material is dripped on the substrate 110 by a spin coating method or an inkjet method. The aligning agent is injected into the microcavity 305 through the injection hole 307. When the aligning agent is injected into the microcavity 305 and then a curing process is performed, a solvent is evaporated and the alignment material remains on an inner wall of the microcavity 305.

Accordingly, a first alignment layer 11 may be formed on the first and second pixel electrodes 191h and 191l and the second insulating layer 250, and a second alignment layer 21 may be formed under the opposing electrode 270. The first alignment layer 11 and the second alignment layer 21 may face each other with the microcavity 305 therebetween, and be connected to each other at the edge of the micro cavity 305.

Light such as ultraviolet rays may be irradiated to the first and second alignment layers 11 and 21 to determine the alignment direction of the first and second alignment layers 11 and 21.

The upper surface of the first alignment layer 11 disposed at the buffer zone BFZ is lower than the upper surface of the first alignment layer 11 disposed at the light transmitting area OPa of the first subpixel PXa or the light transmitting area OPb of the second subpixel PXb. Accordingly, as shown in FIG. 5, in the buffer zone BFZ, a height d2 of the microcavity 305 may be higher than the height d1 of the microcavity 305 at the light transmitting area OPa of the first subpixel PXa or the light transmitting area OPb of the second subpixel PXb.

Figure 19:
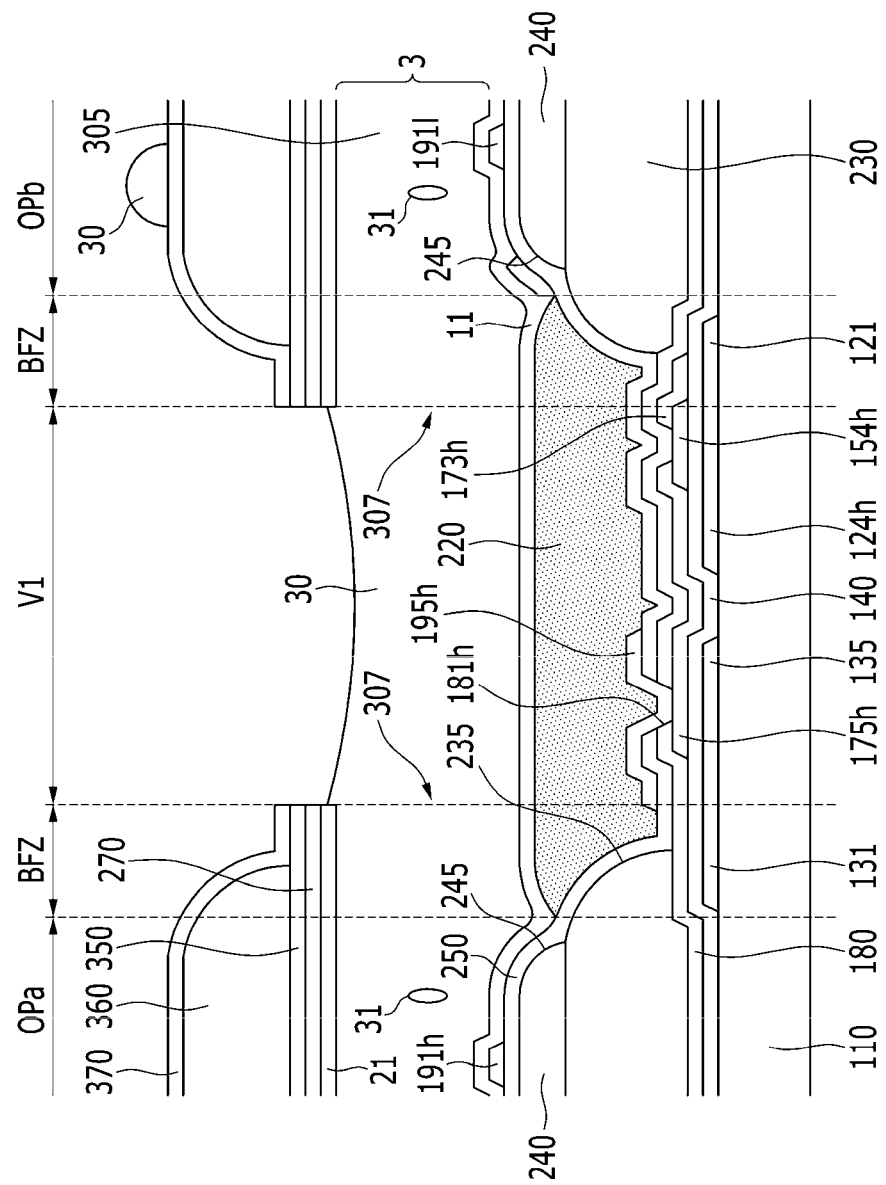

Next, referring to FIG. 19, a liquid crystal material 30 including liquid crystal molecules 31 is dripped on the substrate 110 by an inkjet method or a dispensing method. Thus, the liquid crystal material 30 is injected into the microcavity 305 through the injection hole 307 to form a liquid crystal layer 3. In this case, the liquid crystal material 30 may be dripped at the injection hole 307 formed along the odd-numbered first valley V1, but not dripped at the injection hole 307 formed along the even-numbered first valley V1. In contrast, the liquid crystal material 30 may be dripped at the injection hole 307 formed along the even-numbered first valley V1, but not dripped at the injection hole 307 formed along the odd-numbered first valley V1.

If the liquid crystal material 30 is dripped at the injection hole 307 formed along the odd-numbered first valley V1, the liquid crystal material 30 is injected inside the microcavity 305 through the injection hole 307 by a capillary force. At this time, air inside the microcavity 305 is discharged through the injection hole 307 formed along the even-numbered first valley V1 such that the liquid crystal material 30 may be injected inside the microcavity 305.

Alternatively, the liquid crystal material 30 may be dripped to all injection holes 307. That is, the liquid crystal material 30 may be dripped to the injection holes 307 formed along the odd-numbered first valley V1 and the injection holes 307 formed along the even-numbered first valley V1.

Referring to FIG. 19, after injecting the liquid crystal material 30, the liquid crystal material 30 may remain on the first valley V1 and/or the roof layer 360. As described above, the liquid crystal material 30 remaining on the roof layer 360 may be recognized as a display defect such as a dark part and a texture in the pixel PX such that it must be removed.

Figure 20:
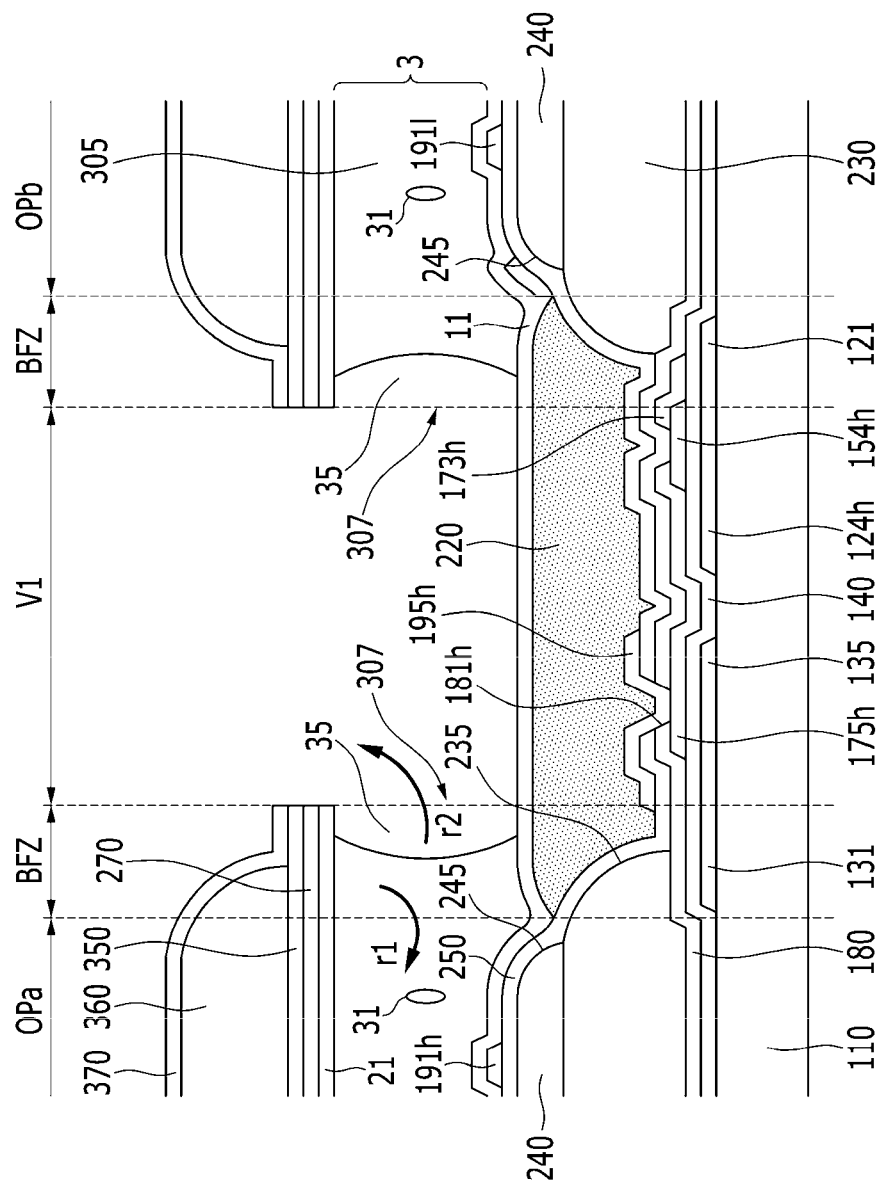

Referring to FIG. 20, the liquid crystal material 30 remained on the roof layer 360 may be removed through DI cleansing, cleansing using an air knife, or a wiping cleansing method. At this time, the liquid crystal material 30 inside the microcavity 305 may be discharged together. However, according to an exemplary embodiment of the inventive concept, since the buffer zone BFZ is disposed between the first valley V1 and the light transmitting area OPa of the first subpixel PXa or the light transmitting area OPb of the second subpixel PXb, the display defect may not be recognized although the liquid crystal material 30 in the microcavity 305 may be removed. Even if the liquid crystal material 30 is somehow removed in the buffer zone BFZ among the microcavity 305 such that a region in which the liquid crystal is removed 35 is formed, the space 35 is covered by the light blocking member 220, thereby the display defect due to the absence of the liquid crystal material 30 may not be recognized.

Particularly, according to an exemplary embodiment of the inventive concept, in the buffer zone BFZ, the height d2 of the microcavity 305 is higher than the height d1 of the microcavity 305 at the light transmitting area OPa of the first subpixel PXa or the light transmitting area OPb of the second subpixel PXb. Accordingly, in the process of removing the remaining liquid crystal material 30, the capillary force in the buffer zone BFZ is lower than the capillary force in the light transmitting area OPa of the first subpixel PXa or the light transmitting area OPb of the second subpixel PXb. Therefore, the liquid crystal material 30 near the boundary of the buffer zone BFZ and the light transmitting areas OPa and OPb is applied with a force to a direction toward the light transmitting areas OPa and OPb like a first direction r1. As described above, in the process of removing the remaining liquid crystal material 30, the liquid crystal material 30 disposed at the light transmitting areas OPa and OPb may be prevented from being removed to the outside due to the force to a direction toward the light transmitting areas OPa and OPb like the first direction r1.

In contrast, the liquid crystal material 30 disposed at the buffer zone BFZ and the first valley V1 may be easily discharged to the outside as shown by a second direction r2. Although the liquid crystal material 30 is partially discharged such that the space 35 is generated in the buffer zone BFZ, the buffer zone BFZ is covered by the light blocking member 220 such that the display defect is not recognized.

Next, referring to FIG. 4, an overcoat 390 is formed by depositing a material which does not react with the liquid crystal molecules 310 on the third insulating layer 370. The overcoat 390 is formed to cover the injection hole 307 through which the microcavity 305 is exposed to the outside, thereby sealing the microcavity 305.

Next, the structure of the liquid crystal display according to an exemplary embodiment of the inventive concept will be described with reference to referring to FIG. 21 along with FIG. 3 and FIG. 4. Like reference numerals are assigned to the same constituent elements as in the previous exemplary embodiment, and the same description is omitted.

Figure 21:
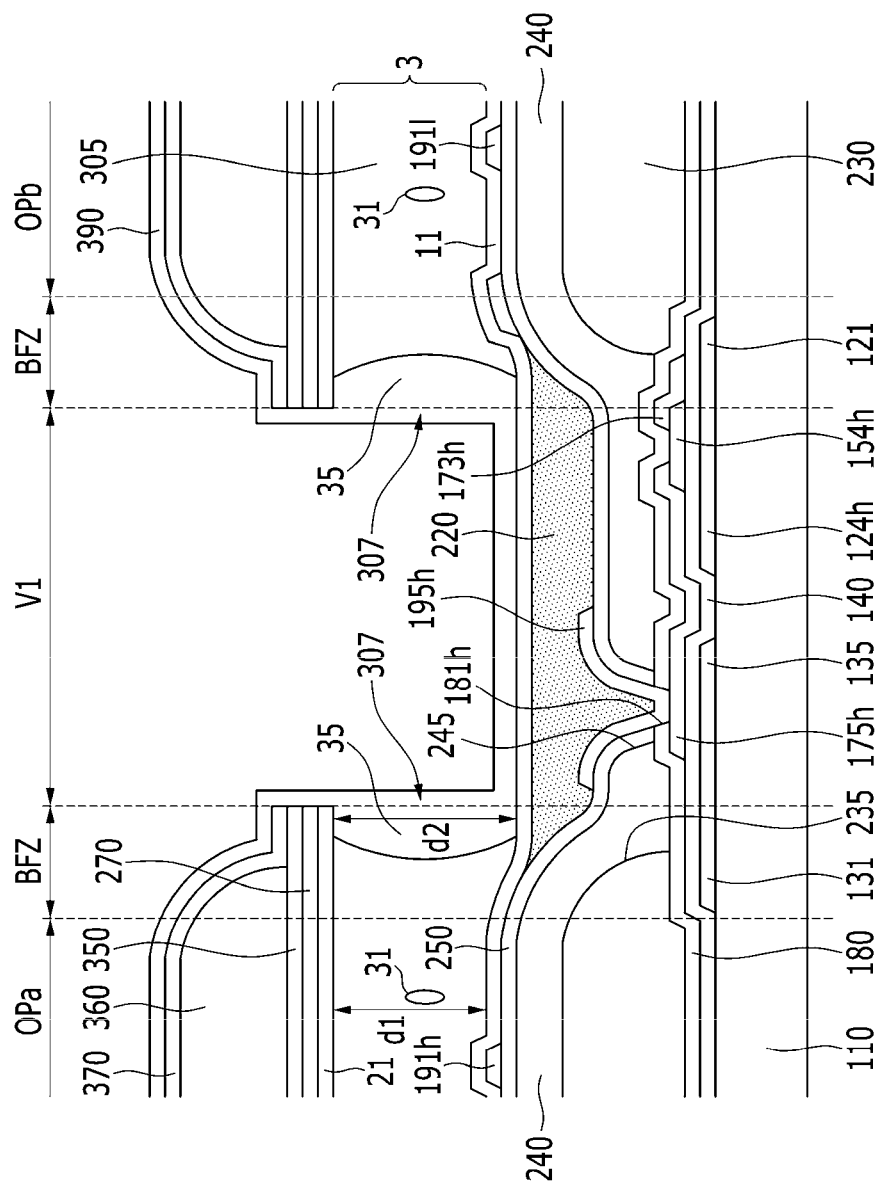
FIG. 21 is a cross-sectional view of another example of the liquid crystal display of FIG. 3 taken along a line V-V.

FIG. 21 is a cross-sectional view of another example of the liquid crystal display of FIG. 3 taken along a line V-V.

Referring to FIG. 21, the liquid crystal display according to the present exemplary embodiment is the same as that of the exemplary embodiment shown in FIG. 3 and FIG. 4, however the first insulating layer 240 may also be disposed at the buffer zone BFZ and the first valley V1. In this case, the boundary of the opening 245 of the first insulating layer 240 may be adjacent to the boundary of the first contact hole 181h or the second contact hole 181l, may enclose the first contact hole 181h or the second contact hole 181l, and may approximately accord with the boundary of the first contact hole 181h or the second contact hole 181l.

In the present exemplary embodiment, the height d2 of the microcavity 305 in the buffer zone BFZ may be higher than the height d1 of the microcavity 305 in the light transmitting area OPa of the first subpixel PXa or the light transmitting area OPb of the second subpixel PXb. For this, in the present exemplary embodiment, the thickness of the light blocking member 220 disposed at the buffer zone BFZ and the first valley V1 may be decreased by a required degree to control an interval between the first alignment layer 11 and the second alignment layer 21. The height of the upper surface of the light blocking member 220 at the buffer zone BFZ and the first valley V1 may be lower than the height of the first and second subpixel electrodes 191h and 191hl in the light transmitting areas OPa and OPb.

The exemplary embodiment in which the first valley V1 and the buffer zone BFZ are disposed between the first subpixel PXa and the second subpixel PXb is shown, however it is not limited thereto. For example, the first valley V1 and the buffer zone BFZ according to the structure and the manufacturing method like an exemplary embodiment of the inventive concept may be applied to the light blocking member 220 disposed between the adjacent pixels PX.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
    a thin film transistor disposed on a substrate;
    a passivation layer disposed on the thin film transistor;
    a pixel electrode disposed on the passivation layer and at a light transmitting area;
    an opposing electrode disposed on the pixel electrode and spaced apart from the pixel electrode;
    a liquid crystal layer disposed in a plurality of microcavities between the pixel electrode and the opposing electrode;
    a roof layer overlapping the pixel electrode, wherein an injection hole of at least one of the microcavities is exposed through a valley and the roof layer and the opposing electrode do not overlap the valley;
    a buffer zone disposed between the light transmitting area and the valley;
    a light blocking member overlapping the valley; and
    a first insulating layer disposed between the passivation layer and the pixel electrode,
    wherein the opposing electrode is disposed between the microcavity and the roof layer,
    wherein a height of the microcavity in the buffer zone is higher than a height of the microcavity in the light transmitting area,
    wherein the first insulating layer is formed through a different step than the passivation layer, and
    wherein the first insulating layer includes a first opening where the first insulating layer is not overlapping the buffer zone and the valley.

2. The liquid crystal display of claim 1, wherein an edge of the first opening is disposed on a color filter on the light transmitting area.

3. The liquid crystal display of claim 2, wherein the pixel electrode includes a pad formed in the valley and the light blocking member directly contact the pad.

4. The liquid crystal display of claim 3, wherein the light blocking member do not overlap the first insulating layer.

5. The liquid crystal display of claim 4, wherein an upper surface of the light blocking member disposed at the buffer zone and the valley is lower than an upper surface of the pixel electrode at the light transmitting area.

6. The liquid crystal display of claim 2, wherein the light blocking member do not overlap the first insulating layer.

7. The liquid crystal display of claim 6, wherein an upper surface of the light blocking member disposed at the buffer zone and the valley is lower than an upper surface of the pixel electrode at the light transmitting area.

8. The liquid crystal display of claim 1, wherein the pixel electrode includes a pad formed in the valley and the light blocking member directly contact the pad.

9. The liquid crystal display of claim 8, wherein the light blocking member do not overlap the first insulating layer.

10. The liquid crystal display of claim 9, wherein an upper surface of the light blocking member disposed at the buffer zone and the valley is lower than an upper surface of the pixel electrode at the light transmitting area.

11. The liquid crystal display of claim 1, wherein the light blocking member do not overlap the first insulating layer.

12. The liquid crystal display of claim 1,
wherein an upper surface of the light blocking member disposed at the buffer zone and the valley is lower than an upper surface of the pixel electrode at the light transmitting area.

* * * * *